US009507042B2

(12) United States Patent
Puryear et al.

(10) Patent No.: US 9,507,042 B2
(45) Date of Patent: Nov. 29, 2016

(54) SYSTEM AND METHOD FOR CONSTRAINED LEAST-SQUARES SPECTRAL PROCESSING AND ANALYSIS OF SEISMIC DATA

(71) Applicant: Lumina Geophysical LLC, Houston, TX (US)

(72) Inventors: Charles Puryear, Houston, TX (US); John Castagna, Houston, TX (US); Oleg Portniaguine, Spring, TX (US)

(73) Assignee: Lumina Geophysical LLC, Houston, TX (US)

( * ) Notice: Subject to any disclaimer, the term of this patent is extended or adjusted under 35 U.S.C. 154(b) by 581 days.

(21) Appl. No.: 13/987,790

(22) Filed: Sep. 3, 2013

(65) Prior Publication Data

US 2014/0067273 A1 Mar. 6, 2014

Related U.S. Application Data

(60) Provisional application No. 61/696,075, filed on Aug. 31, 2012.

(51) Int. Cl.
*G06F 11/00* (2006.01)
*G01V 1/30* (2006.01)

(52) U.S. Cl.
CPC ............. *G01V 1/30* (2013.01); *G01V 2210/20* (2013.01); *G01V 2210/43* (2013.01)

(58) Field of Classification Search
CPC ............... A61B 17/320068; A61B 2019/5276
USPC ...................................... 702/14, 16, 182–185
See application file for complete search history.

(56) References Cited

U.S. PATENT DOCUMENTS

2006/0200034 A1\* 9/2006 Ricci .................. H03H 17/0201
600/513

\* cited by examiner

*Primary Examiner* — Edward Raymond
(74) *Attorney, Agent, or Firm* — Holland & Hart LLP

(57) ABSTRACT

An inversion-based algorithm for computing the time frequency analysis of reflection seismograms using constrained least-squares spectral analysis is formulated and applied to modeled seismic waveforms and real seismic data. The Fourier series coefficients are computed as a function of time directly by inverting a basis of truncated sinusoidal kernels for a moving time window. Spectra may be provided that have reduced window smearing for a given window length relative to the discrete Fourier transform irrespective of window shape, and a time-frequency analysis with a combination of time and frequency resolution that is superior to the short time Fourier transform and the continuous wavelet transform. The reduction in spectral smoothing enables enhanced determination of spectral characteristics of interfering reflections within a short window. The degree of resolution improvement relative to the short time Fourier transform increases as window length decreases.

1 Claim, 22 Drawing Sheets

SYSTEM AND METHOD FOR CONSTRAINED LEAST-SQUARES SPECTRAL PROCESSING AND ANALYSIS OF SEISMIC DATA

BACKGROUND OF THE INVENTION

1. Field of the Invention

Examples of the subject matter disclosed herein generally relate to methods and systems for seismic exploration and, in particular methods and systems for processing and analysis of seismic data using constrained least-squares spectral analysis.

2. Description of the Prior Art

History

Spectral decomposition of reflection seismograms was introduced as a seismic interpretation technique by Partyka (1999). He recognized that seismic frequency spectra using short windows were greatly affected by local reflectivity spectra, and thus carried information about layer characteristics. He showed that simple layers of certain thicknesses exhibit notched spectra, and that the pattern of frequencies at which these notches occur can sometimes be used to infer layer thickness. He also showed that, for this reason, seismic images at different frequencies preferentially illuminate, or respond to, geological variations differently. Spectral time-frequency analysis has since become an important practical seismic interpretation tool that has achieved widespread use.

Early spectral decomposition work primarily used (1) the Short Time Fourier Transform (STFT), which is equivalent to the cross-correlation of the seismic trace with a sinusoidal basis over a moving time window, (2) the Continuous Wavelet Transform (CWT), which is the cross-correlation of the seismic trace against a wavelet dictionary, and (3) Matching Pursuit Decomposition (MPD), which is the decomposition of the seismic trace into basis atoms. The use of these methods for seismic time-frequency analysis is discussed by Chakraborty and Okaya (1995).

The literature is rich in papers discussing geological applications of seismic spectral decomposition, a few of which are mentioned here. The STFT has been successfully applied for stratigraphic and structural visualization (e.g., Partyka, et al., 1999; Marfurt and Kirlin, 2001). Marfurt and Kirlin (2001) derive a suite of attributes, including peak frequency, from spectral decomposition volumes in order to efficiently map stratigraphic features, particularly fluvial channels. These frequency attributes are further described and applied by Liu and Marfurt (2007). Sinha et al. (2005) apply the CWT for stratigraphic visualization and direct hydrocarbon indication. Matos et al. (2010) compute CWT spectral decomposition phase residues as an attribute for stratigraphic interpretation. Castagna et al. (2003) and Fahmy (2008) use MPD for direct hydrocarbon detection. Partyka (2005), Puryear (2006) and Puryear and Castagna (2008) describe the use of spectral decomposition as a driver for thin-layer reflectivity inversion.

Higher resolution seismic spectral decomposition methods would assist in the interpretation of geological features masked by spectral smearing (when the STFT is used) or poor temporal resolution at low frequencies (when the CWT is used). Toward this end, we revisit Fourier theory and then formulate an alternative approach to seismic spectral decomposition using Constrained Least Squares Spectral Analysis, which potentially has advantages over conventional methods such as the STFT and CWT in terms of improved temporal and/or frequency resolution of seismic reflection data.

Introduction

Seismic spectral decomposition (e.g., Partyka. et al., 1999) transforms each reflection seismogram into a time-frequency space that represents localized frequency content as a function of seismic record time. Thus, individual seismic volumes are transformed into multiple frequency volumes that preferentially highlight geophysical responses that appear within particular frequency bands. Commonly used spectral decomposition methods, such as the Fourier Transform and the Continuous Wavelet Transform generally require a tradeoff between time and frequency resolution that may render them ineffective in particular cases for certain interpretation applications, such as layer thickness determination and direct hydrocarbon detection. The objective of this paper is to introduce and evaluate the effectiveness of Constrained Least Squares Spectral Analysis (CLSSA) as a seismic spectral decomposition method and show that it has resolution advantages over the conventional approaches.

Fourier-based spectral decomposition uses a sliding temporal window, which limits both temporal and frequency resolutions. In spectral analysis of seismic events that are near in time to other arrivals, it is often necessary to sacrifice frequency resolution by using a short time window to isolate the event of interest. FIG. 1 illustrates this fundamental problem in spectral decomposition: A pair of reflection coefficients from the top and base of a thin layer is bracketed by nearby strong reflection coefficients. When convolved with a wavelet, the reflection event from the thin layer has interference at its fringes with side-lobes from the bracketing reflections. The correct spectral response for the thin layer (a cosine function times the Ricker spectrum) should have a notch at 50 Hz corresponding to the first spectral notch of the even impulse pair. As emphasized by Partyka (1999), the frequency at which this notch occurs could be used to determine the layer time thickness, which is of great potential utility for pre-drill estimates of reservoir volumetrics. In order to make use of the notch occurrence, the window chosen for spectral analysis must be short enough to avoid interference with nearby reflectors, but long enough so that window smearing effect on the spectrum does not change the notch location. Unfortunately, as illustrated in FIG. 1, this may not be achievable in practice. A Hann window short enough to avoid interference (40 ms in this case) results in a Fourier spectrum that is dominated by the window spectrum, and the notch and peak frequencies do not directly reflect the layer characteristics—which would thereby yield an incorrect reservoir thickness estimate. Longer windows yield spectral estimates that are corrupted by the interfering energy and again yield misleading spectral notch frequencies that would result in incorrect thickness estimates. In such a situation, it would be advantageous to be able to use a short-window without the corresponding loss of frequency resolution inherent in the use of the Fourier Transform.

Short windows are desirable for the temporal isolation of particular portions of seismic traces in order to obtain spectra and spectral attributes (such as peak frequency and amplitude at peak frequency) that are relevant to the characteristics of a given layer. However, the Fourier Similarity Theorem (e.g., Bracewell, 1986) requires that shorter windows of a given shape have poorer frequency resolution which can mask and modify spectral characteristics. Using a given window shape, better frequency resolution can only be achieved with the Fourier Transform at the expense of poorer time resolution by increasing the window length.

Reducing the window effect in seismic time-frequency analysis is, thus, of great potential practical significance.

One approach towards reducing the window effect is to circumvent the Fourier Transform, and solve directly for the Fourier Series coefficients using least-squares analysis within a window (Vaniček, 1969). The Fourier Transform is indeed the least-squares solution for the Fourier Series coefficients, only when the sinusoidal basis functions are orthogonal. When seismic data are windowed, this definition is violated for those frequencies for which the window length is not an integer number of periods. The well-known consequence is smearing of the data spectrum computed with the Fourier Transform by the window transfer function. However, this effect is a result of the definition of the Fourier Transform requiring that the sinusoidal bases are uncorrelated, not a necessary consequence of Fourier Analysis (which is the determination of the Fourier Series coefficients). The Fourier Transform is only one of many possible means of solving for those coefficients. From the point of view of determining the Fourier Series coefficients of a time series within a window, the window smearing effect arises from what can be considered the incorrect implicit requirement of the windowed Fourier Transform that the sinusoidal bases are orthogonal over the window length. This results in the Fourier Transform yielding the spectrum of the windowed data rather than the spectrum of the data within the window. Seismic time-frequency analysis by direct solution of the normal equations for the Fourier Series coefficients when the sinusoidal bases are not orthogonal has, perhaps surprisingly, not been reported upon in the seismic spectral decomposition literature. Such an approach is complicated by the fact that the inversion for these coefficients is non-unique, and constraints are thus required.

SUMMARY OF THE INVENTION

An inversion-based algorithm for computing the time-frequency analysis of reflection seismograms using Constrained Least-Squares Spectral Analysis is formulated and applied to modeled seismic waveforms and real seismic data. The Fourier Series coefficients are computed as a function of time directly by inverting a basis of truncated sinusoidal kernels for a moving time window. The method results in spectra that have reduced window smearing for a given window length relative to the Discrete Fourier Transform irrespective of window shape, and a time-frequency analysis with a combination of time and frequency resolution that is superior to both the Short Time Fourier Transform and the Continuous Wavelet Transform. The reduction in spectral smoothing enables better determination of the spectral characteristics of interfering reflections within a short window. The degree of resolution improvement relative to the Short Time Fourier Transform increases as window length decreases. As compared to the Continuous Wavelet Transform, the method has greatly improved temporal resolution, particularly at low frequencies.

We refer to the application of constraints to the solution of the normal equations for the Fourier Series coefficients as Constrained Least-Squares Spectral Analysis (CLSSA). We can expect the results of CLSSA to be very dependent on the constraints applied, the assumptions made, and the parameters chosen. Nevertheless, as time-frequency analysis is generally non-unique, this should not deter us from investigating the potential benefits of such a method.

For our purpose of investigating possible improvements in seismic spectral decomposition that will allow the use of shorter windows than are practicable with the ordinary Fourier Transform, we formulate and apply an algorithm that applies model and data constraints in a particular manner using well known numerical methods that have been commonly used for other applications. Use of other algorithms and other constraints to invert the normal equations are certainly feasible. Our objective is only to show the potential value of the general CLSSA approach for time-frequency analysis of reflection seismograms. In particular, we will assess the temporal and frequency resolution that can be achieved with our CLSSA algorithm, and compare results to the Short-Time Fourier Transform (STFT) and the Continuous Wavelet Transform (CWT) for synthetic and real seismic data, as these are presently the two most commonly used spectral decomposition methods in exploration geophysics practice.

BRIEF DESCRIPTION OF THE DRAWINGS

In the following, preferred embodiments of the invention are depicted with reference to the accompanying Figures, in which.

DETAILED DESCRIPTION OF EXAMPLES OF THE INVENTION

Fourier Transform

Figure 1:
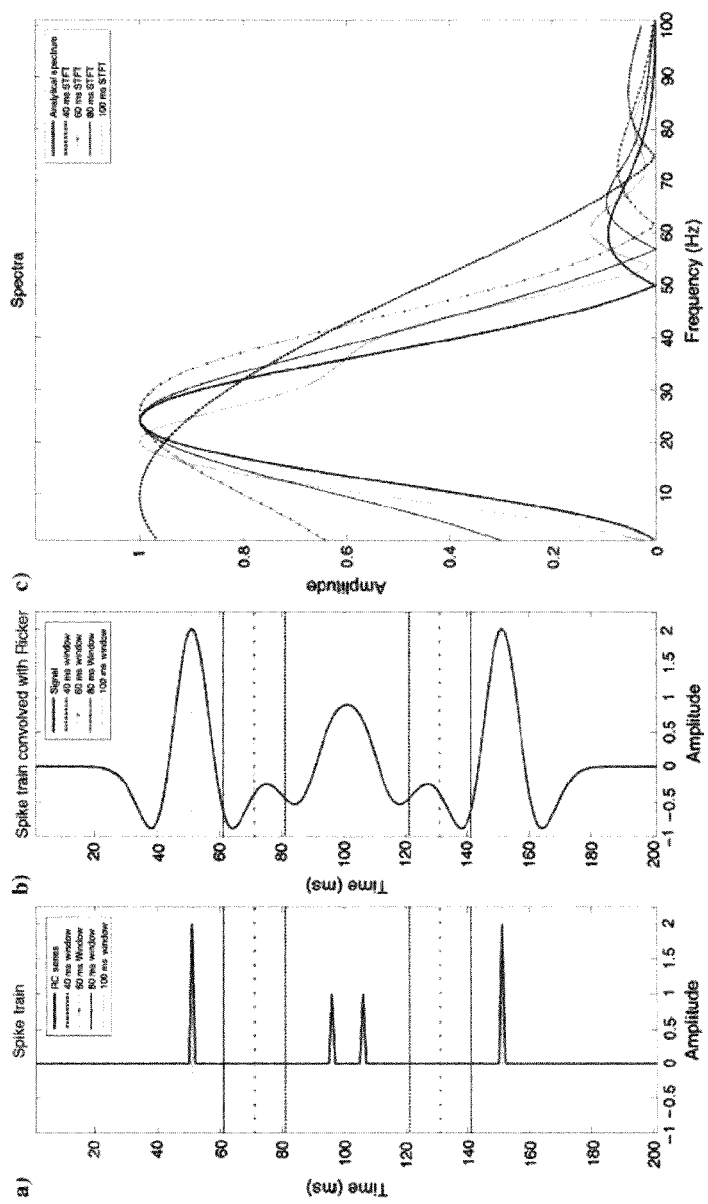
FIG. 1. Windowed spectral analysis of an even reflection coefficient pair contained within a thicker even reflection coefficient pair. Horizontal lines represent windows of different lengths used to compute the spectra. Plots show (a) an even reflection coefficient pair (10 ms thick) within a series of Hann window limits with a thicker even reflection coefficient pair (100 ms thick) falling just at the limits of the longest DFT window, (b) the convolution of the reflectivity series with a 30 Hz Ricker wavelet, and (c) the Fourier Transform computed using the series of Hann windows and the analytical spectrum.

The Fourier Transform is the mathematical basis of the STFT used in spectral decomposition. The Fourier Transform projects infinite sinusoidal bases on the signal and is thus the LMSE solution for the Fourier Series coefficients:

$$G(f) = \int_{-\infty}^{+\infty} g(t)e^{-i2\pi ft} dt, \quad (1)$$

where t is time, f is frequency, g(t) is the continuous time signal, and G(f) is the continuous complex spectrum. This simple projection of the bases onto the time series is applicable because the bases are infinite and thus orthogonal. The Fourier Transform spectrum is continuous and aperiodic in time and frequency (i.e. there are no periodic frequency wrapping effects in the limit dt→0). In digital applications, however, use of the Discrete Fourier Transform (DFT) assumes discretely sampled and periodic series in both the time and frequency domains.

The DFT is the modification of the Fourier Transform for application to discrete signals. In computing the DFT, the sinusoidal basis functions are only orthogonal when their periods are integer fractions of the period of the lowest non-zero frequency. The DFT is defined as follows:

$$G(k\Delta f) = \sum_{n=0}^{N-1} g(n\Delta t)e^{-\frac{2\pi i}{N}k\Delta f n \Delta t}, k = 0, \ldots, N-1, \quad (2)$$

where N is the number of time samples, n is the time sample index, $\Delta t$ is the time increment, k is the frequency sample index, $\Delta f$ is the frequency increment, g(n$\Delta t$) is the discretely-sampled time signal, and G(k$\Delta f$) is the discretely-sampled complex spectrum.

While the DFT yields integrated information about the entire trace, seismic signals typically contain variations in frequency content as a function of time. In order to capture local anomalies related to stratigraphy, structure, and fluid content, we must apply a time-frequency transform that maximizes time-localization of spectral features. The STFT is the DFT applied as a function of time using a sliding time window (that is usually tapered to have a desired transfer function). This amounts to cross-correlation of orthogonal sinusoidal basis functions with a windowed segment of the signal. First the time-time panel, $g_w$, is derived from the windowed signal and expressed as a function of window center and window sample:

$g_w(n\Delta t, m\Delta t) = w(m\Delta t)g((n+m)\Delta t),$ $n=0, \ldots, N-1$ and $m=-(M-1)/2, \ldots, (M-1)/2$ (3)

where n is analysis time sample (center of the window), m is the window sample index, M is the number of samples in the window, w(m$\Delta t$) is the window function (usually tapered towards zero at the endpoints in order to minimize the Gibbs Effect) and $g_w(n\Delta t, m\Delta t)$ is the windowed time-time panel as a function of window position and window sample. Second, the forward STFT is defined as the DFT of a time-time panel over the dimension of the window sample model. This results in a time-frequency panel:

$$G(n\Delta t, k\Delta f) = \sum_{m=-(M-1)/2}^{(M-1)/2} g_w(n\Delta t, m\Delta t)e^{-\frac{2\pi i}{M}k\Delta f m \Delta t}. \quad (4)$$

The projection of the infinite sinusoidal bases onto the windowed portion of the time series by the DFT occurs only over the length of the window. This is equivalent to truncating the bases to the window length; the sinusoidal bases are then no longer generally orthogonal with the exception of those that have an integer number of cycles within the window length. Thus, the windowed DFT does not give the spectrum of the data within the window but the spectrum of the windowed time series that has data (perhaps tapered) within the window and zeros outside the window. By the Fourier Convolution Theorem, this results in a spectrum that is the convolution of the true spectrum of the data with the spectrum of the window. This spectral smoothing causes a loss of frequency resolution and an increase in the bandwidth of the spectrum. Thus, for real time series, the standard deviation about the mean of the positive frequencies of the spectrum of the windowed data will always be greater than the standard deviation of the positive frequencies of the true spectrum When the data are windowed, the sinusoidal uncorrelated bases are spaced at a frequency increment of df>=1/T, where T is the window time length MΔt. When the orthogonality condition is not met, the DFT can be thought of as "leaking" energy among frequencies. For an extensive treatment of the subject of Fourier Transform windowing and associated spectral leakage, see Bracewell (1986).

However, the reduced frequency resolution of the STFT is not a fundamental limitation of Fourier theory. It is a consequence of the STFT definition (i.e. the use of orthogonal basis functions inside a short time window). For very short windows, the resulting spectrum may bear little resemblance to the spectrum of the data. To compute the spectrum of the data within the window, rather than the spectrum of the windowed data, we must invert the normal equations with non-zero off diagonal terms and, thus, properly solve for the Fourier Series coefficients. We shall see that such proper application of Fourier theory can significantly increase the resolvability of frequency components, particularly when appropriate constraints are applied.

Continuous Wavelet Transform

The CWT is a narrowband filter applied to the signal in the time domain using stretched versions of a mother wavelet; it decomposes the seismic data into octave or sub-octave scales of the original data. The CWT is described by Grossman et al. (1989) and Mallat (1999). Chakrahorty and Okaya (1995) apply CWT spectral decomposition to seismic data. For seismic applications, the semi-orthogonal Morlet wavelet is commonly preferred. The forward CWT for a real wavelet dictionary is as follows:

$$W_{(a,b)} = \frac{1}{\sqrt{a}} \int \Psi\left(\frac{t-b}{a}\right) s(t) dt, \quad (5)$$

where a is a scaling parameter, b is a translation parameter, $\Psi$ is the mother wavelet, s(t) is the signal, and $W_{(a,b)}$ is the CWT scale decomposition. As typically applied, the CWT produces scales of the data. A scale corresponds to a more or less narrow frequency band, and one could view the center frequency of these bands as output frequencies. In order to compute frequencies instead of scales, Sinha et al. (2005) define a time-frequency CWT, which is the DFT of the inverse CWT. In this paper, we use the standard CWT process described by equation 5 above, with the frequency axis representing the center frequency of Morlet atoms, as this is a commonly employed method.

CWT solutions suffer from resolution limitations that are similar to the OFT, although CWT resolution varies with scale or frequency; the resulting decomposition has low time resolution/high frequency resolution at low frequencies and high time resolution/low frequency resolution at high frequencies (e.g., Sinha, et al., 2005; Puryear, et al., 2008).

Inversion-Based Spectral Analysis

Seismic spectral decomposition is a trace-by-trace operation. Because each 1-dimensional seismic trace is converted to a 2-dimensional time-frequency panel, the process expands the dimensions of the original data via a non-unique transformation, suggesting an inversion-based approach to the problem. Several investigators have used different empirical criteria in order to define inversion-based spectral analysis methods.

Vaniček (1969) iteratively finds the best least squares fit coefficients for sines and cosines, subtracts and repeats the process on the residual until the algorithm converges. Oldenburg (1976) uses the first Dirichlet criterion of the Backus-Gilbert linear inverse in order to compute the DFT of potential field data, while minimizing the effects of recording gaps and noise. Sacchi and Ulrych (1996) derive a similar functional using a Bayesian inversion approach to estimate the 2d spectral signature of a limited linear array of receivers. The results show minimal side lobe artifacts, resulting in significant extrapolation of the wavefield aperture beyond the original receiver array. In a method related to the Vaniček method, Xu et al. (2005) derive an algorithm for reducing leakage of spatial spectra by iteratively solving for and subtracting the most energetic wavenumber components from the signal. This is similar to matching pursuit decomposition with non-orthogonal wavelets, which can be unstable. None of these methods have been applied to time-frequency analysis of reflection seismograms for interpretation of, or inversion for, layer characteristics.

Daubechies et al. (2008) describes the general mathematical convergence of $L_p$ norm functionals, including the minimum support functional, for computationally cumbersome problems. Although Daubechies et al. (2008) do not explicitly apply their method to the problem of time-frequency analysis of signals, we use a similar approach for application to the problem of seismic spectral decomposition. Unlike Daubechies et al. (2008), in the particular implementation we use in this study, we apply Tikhonov regularization to the functional and, because our matrices are not computationally large, solve the problem analytically by Lagrange multipliers as described in the following section.

CLSSA Description

Following the Portniaguine and Castagna (2004) approach to seismic wavelet decomposition and reflectivity inversion, we invert the normal equations by applying an iteratively re-weighted least squares regularization algorithm to the complex spectral decomposition inverse problem using a minimum support functional, which is defined by Last and Kubik (1983) and Portniaguine and Zhdanov (1998). This regularization scheme incorporates a priori constraints, differing from post-inversion weighting schemes that impose constraints on the solution after the inversion process. Prior publications do not describe the application of such a method to direct solution of the normal equations for the Fourier Series coefficients. The following inversion formulation is applied to the data within each window centered at a time sample, then looped over each sample of a trace.

We start with the definition of the forward problem:

$$Fm=d, \quad (6)$$

where F is the kernel matrix with real or complex sinusoidal basis, m is the model parameter vector (unknown frequency coefficients), and d is the windowed seismic data. For the problem of spectral decomposition of reflection seismograms, the data are real. However, in the CLSSA algorithm we present here, we can take d to be a segment of a complex seismic trace, $$d = d_r + i d_i \quad (6a)$$

where $d_r$ is the windowed segment of the real seismic trace, and $d_i$ is the windowed segment of the Hilbert Transform of the seismic trace. This is not a requirement of the CLSSA approach, but is a way of applying additional constraint to further stabilize the solution for short window lengths. We further define $d_0$ as the trace sample at the center of the window.

The solution to (6) is achieved using well-known normal equations:

$$F'Fm = F'd. \quad (7)$$

We choose the columns of matrix F to consist of complex sinusoidal signals truncated by the endpoints of the window in the time domain:

$$F(t,f) = \cos(2\pi k \Delta f m \Delta t) + i \sin(2\pi k \Delta f m \Delta t). \quad (8)$$

The number of columns in F is the number of frequencies, and the number of rows in F is the number of samples in the time window. Unless otherwise stated, the complex form of F is used for the examples in this paper (in some examples, only the real part is used). The inverse problem objective is to compute m given F and d. The ordinary LMSE solution to equation 6 from the normal equations is $$m = (F^*F)^{-1} F'd, \quad (9)$$

where * denotes the complex conjugate transpose. When the sinusoids are (or are assumed to be) uncorrelated, $F^*F = 1$ and (9) reduces to:

$$m = F^* d, \quad (10)$$

which is equivalent to the DFT of the trace segment.

When the data are windowed, however, the elements of F are generally correlated, and constraints are required to achieve a unique solution. In order to constrain the inversion of equation 6, we introduce diagonal matrices $W_m$ and $W_d$, which are respectively model and data weights. $W_m$ changes iteratively. The initial model weighting matrix on the first iteration is:

$$W_m = I \quad (11)$$

$W_d$ remains constant throughout the iterations. For a Hann taper:

$$w_d = \text{Diag}\left(0.5 + 0.5\cos\left(\frac{2\pi n \Delta t}{l}\right)\right) \text{abs}(d_0). \quad (12)$$

where l is window length, $n\Delta t$ is time relative to the window center, $\text{abs}(d_0)$ is the data envelope value (instantaneous amplitude) at the center of the window, which scales the sinusoids to the data, and the operator Diag( ) transforms a vector to a diagonal matrix containing the argument vector on the main diagonal. Applying $W_d$ and $W_m$ to Equation 6, we obtain $$W_d F W_m (W_m)^{-1} m = W_d d. \quad (13)$$

We introduce the weighted quantities $$F_w = W_d F W_m \text{ and} \quad (14a)$$

$$m_w = W_m^{-1} m; \quad (14b)$$

and recast equation 13 as a model and data weighted ill-posed inverse problem:

$$F_w m_w = W_d d. \quad (15)$$

To solve equation 15, we apply Tikhonov regularization, which is similar to the method of Marquardt (1963). Following Tikhonov and Arsenin (1977), we reformulate ill-posed equation 15 by replacing it with a well-posed minimization problem. This is accomplished by defining the Tikhonov parametric functional in the space of weighted model parameters (Portniaguine and Zhdanov, 1998):

$$\|F_w m_w - W_d d\|^2 + \alpha \|m_w\|^2 = \min, \quad (16)$$

where $\alpha$ is a regularization parameter that can be varied to control the sparsity and stability of the solution. We set $\alpha$ to a fraction oldie maximum value along the diagonal of the weighted Gram matrix $$\alpha = \alpha_F (\max(\text{diag}(F_w F_w^*))), \quad (17)$$

where $\alpha_F$ is a fractional multiplier and the operator diag takes the diagonal of a matrix. Thus, $\alpha$ varies with each iteration step. We choose the $\alpha_F$ value empirically to allow from 0.1% to 1% misfit to the data. As shown below, our selection of $\alpha_F$ is chosen so that the method is robust to noise present in the data.

Writing the analytical Lagrange solution to equation 16 (Portniaguine, 1999), $$m_w = F_w^* (F_w F_w^* + \alpha I)^{-1} W_d d. \quad (18)$$

The matrix inversion in equation 18 is computed by Gaussian elimination. The model parameters are reconstructed by $$m = W_m m_w, \quad (19)$$

where m is the computed frequency spectrum of the data.

Figure 2:
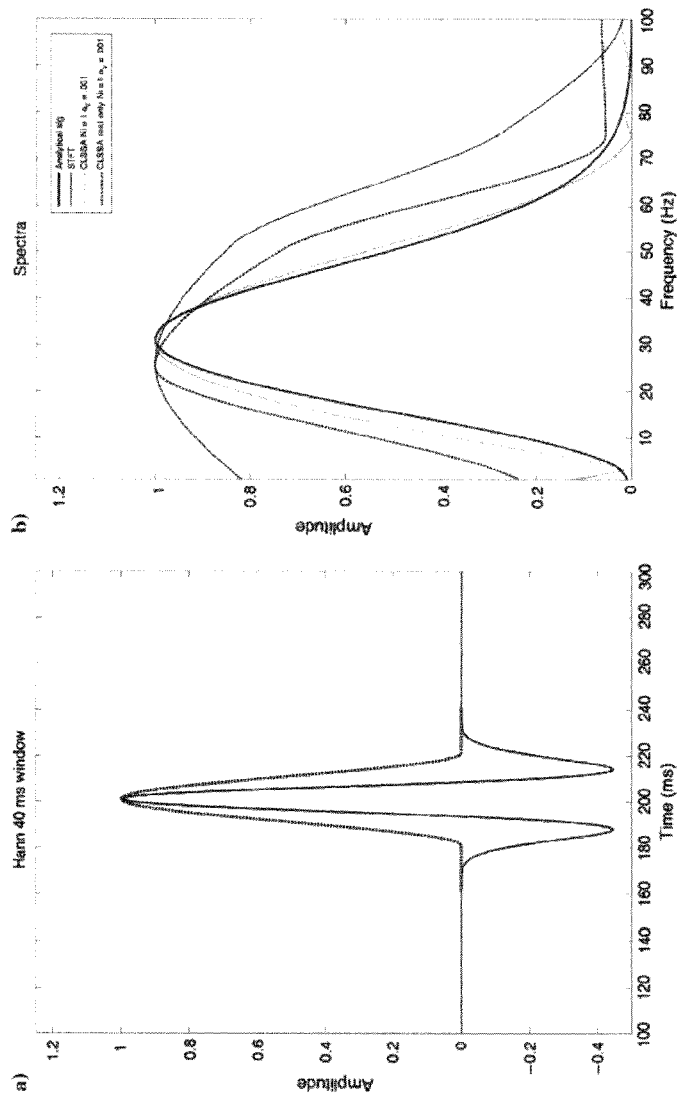
FIG. 2. Comparison of results for STFT, CLSSA (Ni=1, $\alpha_F$=0.001) and real valued CLSSA (Ni=1, $\alpha_F$=0.001) applied to a 30 Hz Ricker wavelet using a 40 ms Hann window function. Plots show: the Ricker wavelet with Hann window function and b) comparison of the analytical Ricker spectrum to STFT and CLSSA. CLSSA closely matches the analytical spectrum, while the STFT strongly broadens the spectrum. The real CLSSA solution is intermediate to the CLSSA and STFT.

This is the first step of an iteratively re-weighted least squares regularization algorithm ($N_i = 1$, were $N_i$ is the number of iterations). When the window is a boxcar, $N_i = 1$ and $\alpha = 0$, and $d_i$ is taken to be zero, m is equivalent to the DFT of the data if the frequencies selected are the DFT frequencies and no imaginary part is used. Otherwise, in this first step, when $\alpha \neq 0$ and is small, m is a smooth spectrum that is tighter than the DFT. FIG. 2 shows spectra for a 30 Hz Ricker Wavelet windowed with a 40 ms Hann tapered window centered on the waveform. The full CLSSA solution, m, using $N_i = 1$ and $\alpha_F = 0.001$ closely approximates the analytical spectrum of the Ricker wavelet while the Fourier Transform is much broader and exhibits the wrong peak frequency. The CLSSA result without utilizing the imaginary part, is not quite as good, but far better than the Fourier Transform. This is significant because, as no Hilbert operator is applied, CLSSA using only the real waveform has precisely the same temporal resolution as the Fourier Transform while having greatly improved frequency resolution. This indicates that, for a given window, CLSSA has a better Heisenberg Uncertainty Product (standard deviation of the waveform in time multiplied by the standard deviation of the spectrum) than does the Fourier Transform. Thus far, we have not found a window for which this is not the case.

FIG. 2 does illustrate an issue at near zero frequencies. The Ricker Wavelet is zero mean and thus should have zero amplitude at zero frequency. However, the mean value over a short window is non-zero and time variant. In fact, it is unclear what is meant by time localization at zero frequency. Let us assume that we have a short time window over which the signal is a constant value. This could be a windowed square wave, box car, step function, constant DC value etc. All have different analytical spectra but no windowed spectral analysis method would have the ability to locally recognize the true spectrum in this case. As a practical matter, the shorter the window, the less meaningful the low frequency values will be.

If more compact spectra are desired (as would be the case for known sparse spectra, or simply to sharpen frequency peaks for attribute analysis) additional iterations can be performed. The model weights are updated by $$W_m = \text{Diag}(\text{abs}(m)). \quad (20)$$

Equation sequence (18)-(19)-(20) is iterated $N_i$ times according to the desired compaction of the model space. Useful rules of thumb seem to be $N_i=1$ for least compactness, $N_i=2$ for intermediate compactness, and $N_i=10$ for most compactness (sparsest solution). In general, the shorter the window, the greater the number of iterations needed to compact the spectrum.

Figure 3:
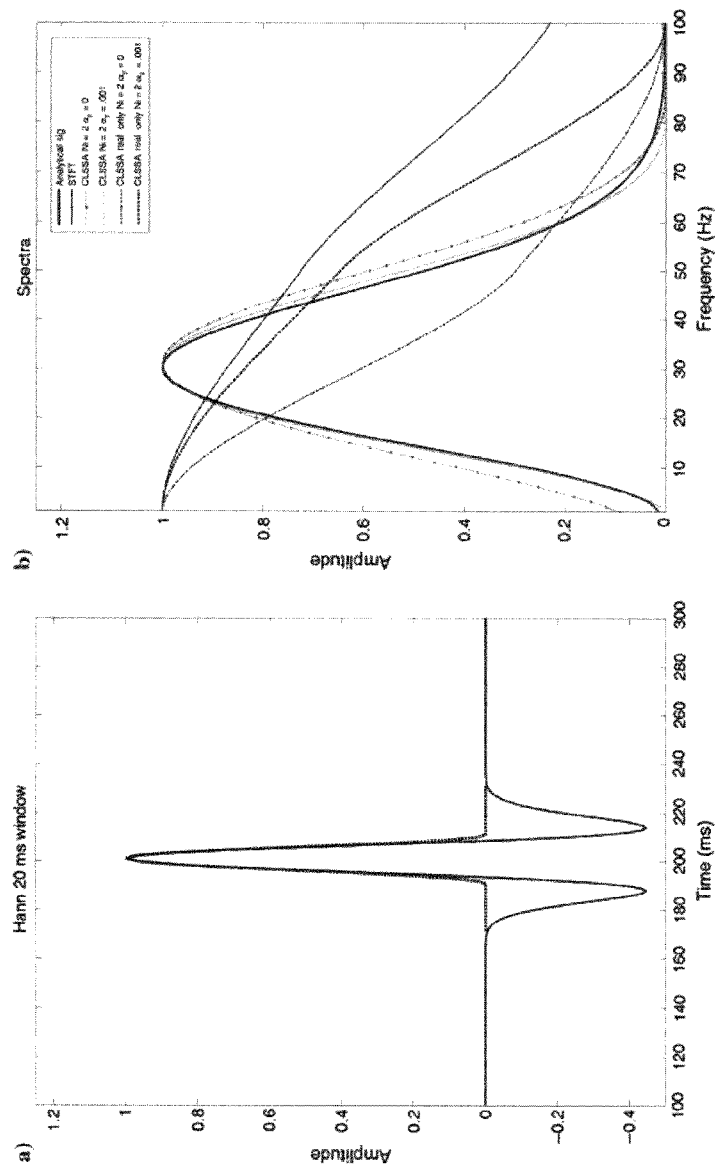
FIG. 3. Comparison of results for STFT, CLSSA (Ni=2, $\alpha_F$={0.001}) and real valued CLSSA (Ni=2, $\alpha_F$={0.001}) applied to a 30 Hz Ricker wavelet using a 20 ms Hann window function. Plots show: (a) the Ricker wavelet with Hann window function and b) comparison of the analytical Ricker spectrum to STFT, CLSSA, and real valued CLSSA. CLSSA closely matches the analytical spectrum, while the STFT strongly broadens the spectrum. The real CLSSA solution frequency resolution is slightly better than the STFT. Note that, for complex CLSSA, the use of non-zero $\alpha_F$ improves the accuracy of the method for this example.

FIG. 3 shows Ricker Wavelet spectra for a very short (20 ms) Hann window. In this case, 2 iterations with, $\alpha_F=0.001$ were required for a close match to the analytical spectrum. We also include the result obtained setting $\alpha_F=0$ to demonstrate the differences among the solutions and the impact of $\alpha_F$. In this example, for complex CLSSA, using a non-zero $\alpha_F$ improves the solution significantly. This illustrates the need for synthetic modeling to empirically select CLSSA parameters.

The values of m at iteration $N_i$ is the frequency spectrum of the data at the center of the given time analysis window. For time-frequency analysis, the window is shifted along the seismic trace, and $m_w$ is computed at each time sample in order to generate a complete 2D time-frequency panel. Because only the data within the short window are inverted at any given computational step, the Gram matrix $F_w F_w^*$ is small and memory limitations are not significant.

The sequence described here is presented as only one representative means of constraining the least-squares spectral analysis. Other constraints, analysis window types, or numerical methods can potentially be applied. Our main objective is to demonstrate the improvements in resolution that can be obtained by solving directly for the Fourier coefficients using constrained least-squares.

Thin Layer Example

Figure 4:
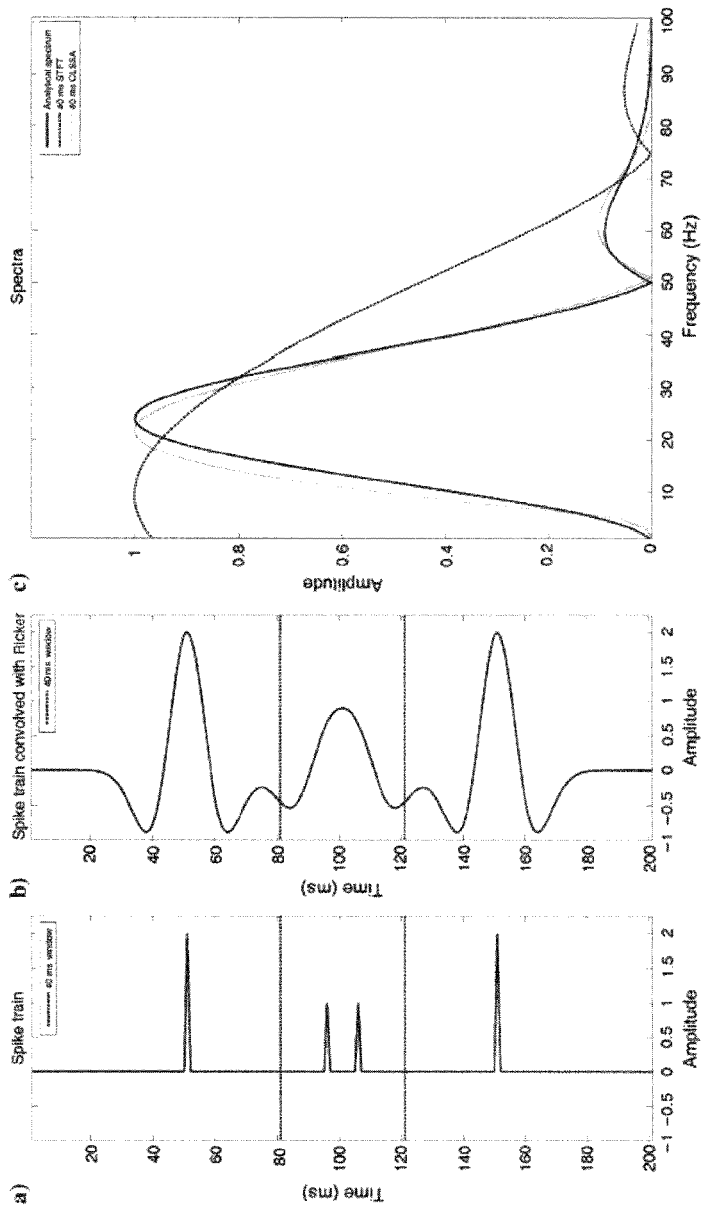
FIG. 4. Windowed spectral analysis of an even dipole reflection pair contained within a thick even reflection coefficient pair. Plots show (a) an even reflection coefficient pair (10 ms thick) with a thicker even re pair (100 ms thick) falling outside the window. (b) the convolution of the reflection coefficient series with a 30 Hz Ricker wavelet and (c) the spectrum computed using a 40 ms Hann windowed STFT and CLSSA [Ni=1, $\alpha_F$=0.001] together with the analytical spectrum. CLSSA locates the spectral notch much more accurately than the equivalent-window STFT.

FIG. 4 shows the application of CLSSA to the interfering thin layer example shown in FIG. 1 where the Fourier Transform was unable to characterize the thin layer spectrum properly with any window length. It can be seen that for the 40 ms window (which is the largest window without interference effects) CLSSA closely approximates the desired spectrum, locates the notch almost exactly, and gives a slightly wrong peak frequency. This is in contrast to the Fourier Transform result with the same window length which exhibits very misleading notch and peak frequencies.

Application to Analytical Waveforms

Figure 5:
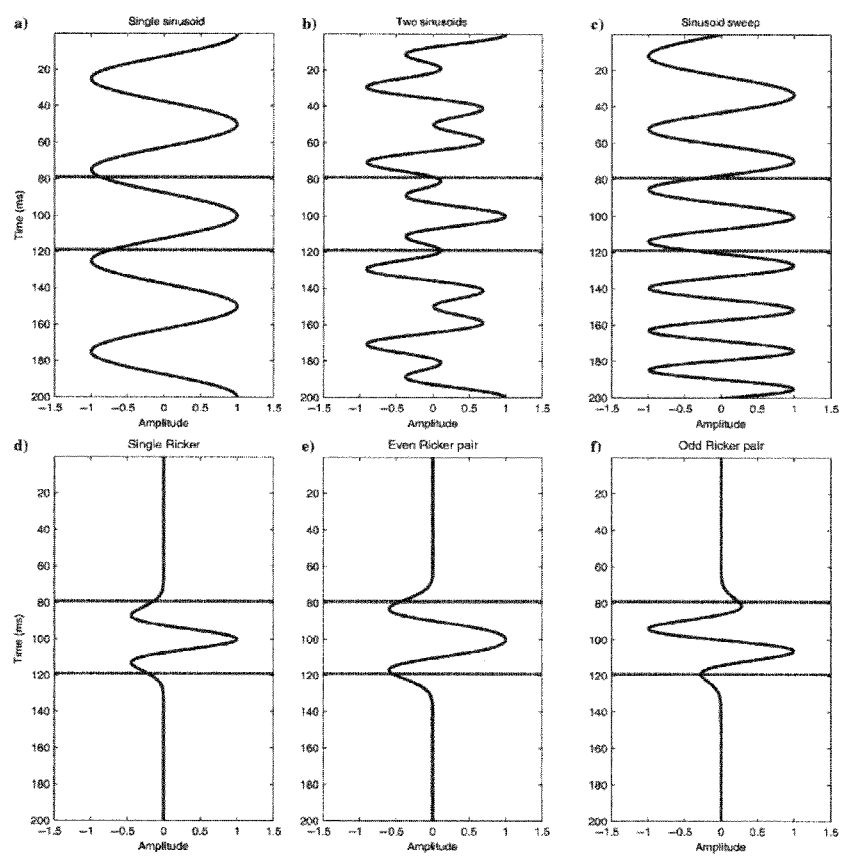
FIG. 5. Six trace models with length 200 ms and sampling rate 1 ms. Plots show (a) a single sinusoid at 20 Hz, (b) a pair of sinusoids 20 Hz and 50 Hz superimposed, (c) a chirp frequency sweep between 20 Hz and 50 Hz, (d) a single Ricker wavelet with a peak frequency of 30 Hz, (e) an even pair of 2 interfering Ricker wavelets with peak frequencies of 30 Hz and 10 ms spacing, and (f) an odd pair of 2 interfering Ricker wavelets with peak frequencies of 30 Hz and 10 ms spacing. The horizontal red lines represent a 40 ms time window centered at 101 ms.

Analytical waveforms with known frequency spectra are used to compare CLSSA to the STFT and CWT (see FIG. 5). Waveforms tested include six cases: (a) a single 20 Hz sinusoid, (b) a pair of 20 Hz and 50 Hz beating sinusoids, (c) a 20 Hz to 50 Hz chirp signal, (d) a single 30 Hz Ricker wavelet, (e) an even pair of interfering Ricker wavelets, each with 30 Hz peak frequency and 10 ms spacing, and (f) an odd pair of interfering Ricker wavelets, each with 30 Hz peak frequency and 10 ms spacing. The trace length is 200 ms, and the sample rate is 1 ms. We computed the STFT and CLSSA of these models using a 40 ms Hann window (the CWT basis function length varies with frequency).

Figure 6:
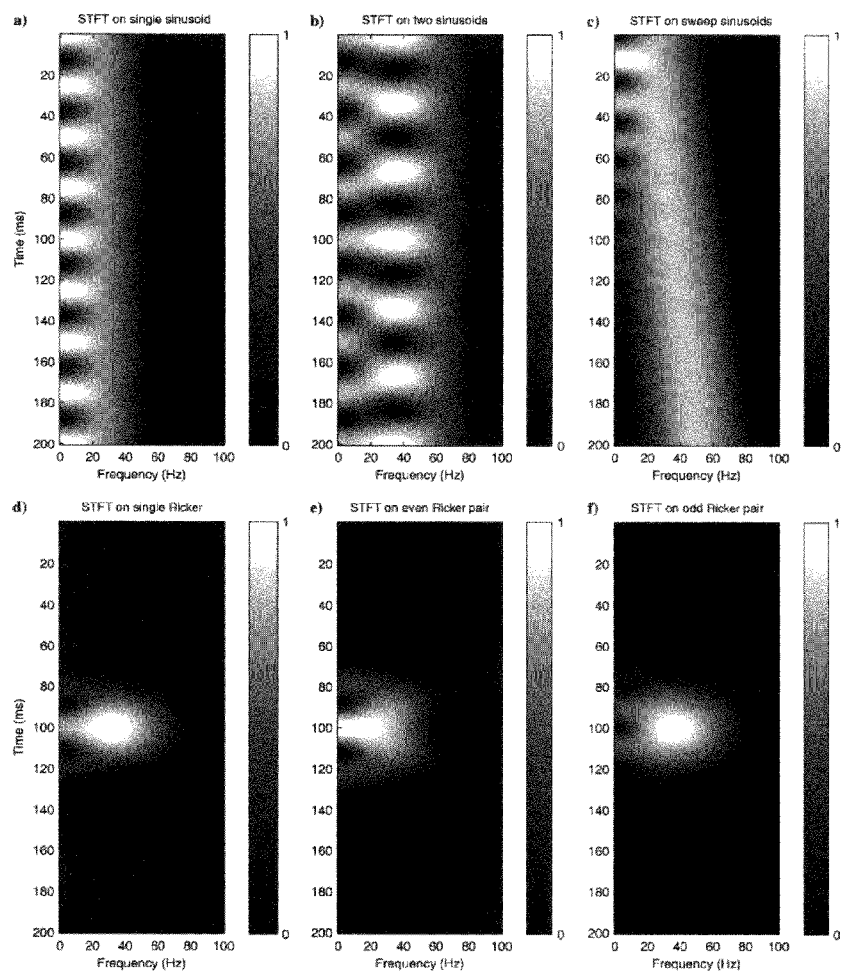
FIG. 6. Six panels illustrating application of the STFT using a window length of 40 ms to the six trace models with length 200 ms and sampling rate 1 ms shown in FIG. 3. Figures show (a) a single sinusoid at 20 Hz, (b) a pair of sinusoids at 20 Hz and 50 Hz superimposed, (c) a chirp frequency sweep between 20 Hz and 50 Hz, (d) a single Ricker wavelet with a peak frequency of 30 Hz, (e) an even pair of 2 interfering Ricker wavelets with peak frequencies of 30 Hz and 10 ms spacing, and (f) an odd pair of 2 interfering Ricker wavelets with peak frequencies of 30 Hz and 10 ms spacing.

FIG. 6 shows the time-frequency panels from the application of the STFT to the six analytical waveforms shown in FIG. 5. On the sinusoid waveform frequency panels, we observe that the independent frequencies are poorly resolved due to frequency smearing. This smearing is caused by the convolution of the data spectrum with the window transfer function. The STFT results for all model waveforms have notches in time. The time notch period in FIG. 6a is inversely related to frequency:

$$T_{sin} = 1/(2 \cdot F_{sin}) = 1/(2 \cdot 20 \text{ Hz}) = 25 \text{ ms}, \quad (21)$$

where $F_{sin}$ is the sinusoid frequency and $T_{sin}$ is the time notch period. For multiple sinusoids (FIG. 6b), we observe superposition of notches in time. The STFT of the chirp signal (FIG. 6c) also shows frequency smearing around the smoothly varying peak frequency within the window and temporal notching. For the Ricker wavelet models, note the smearing of sidelobe energy to zero frequency (referred to as DC). Even and odd dipole pairs have characteristic notch periods in the frequency domain (Marfurt and Kirlin, 2001; Puryear and Castagna. 2008) that are determined by layer time thickness. These notches are important interpretive features (Partyka, 1999) and also drive spectral inversion for layer thickness (Puryear and Castagna, 2008). If the notches are misplaced, serious interpretation errors can result. The frequency notch period ($F_{bed}$) of an even dipole with thickness $T_{bed}=10$ ms should be:

$$F_{bed} = 1/T_{bed} = 1/0.01 \text{ s} = 100 \text{ Hz}. \quad (22)$$

For the analytical spectrum of the even pair, a peak occurs at 0 Hz and a notch occurs at $F_{bed}/2=50$ Hz. On the STFT panel, we observe the notch at approximately 75 Hz due to spectral smearing. In a conventional spectral decomposition analysis, this would result in a large error in layer thickness determination. An analytical odd dipole pair has notches at 0 Hz and 100 Hz, which are not readily observable in these models due to limited wavelet bandwidth. In general, on application of the STFT to real seismic data traces, we expect to observe time notching, frequency smearing, and artificial translation of reflectivity notches to other misleading frequencies.

Figure 7:
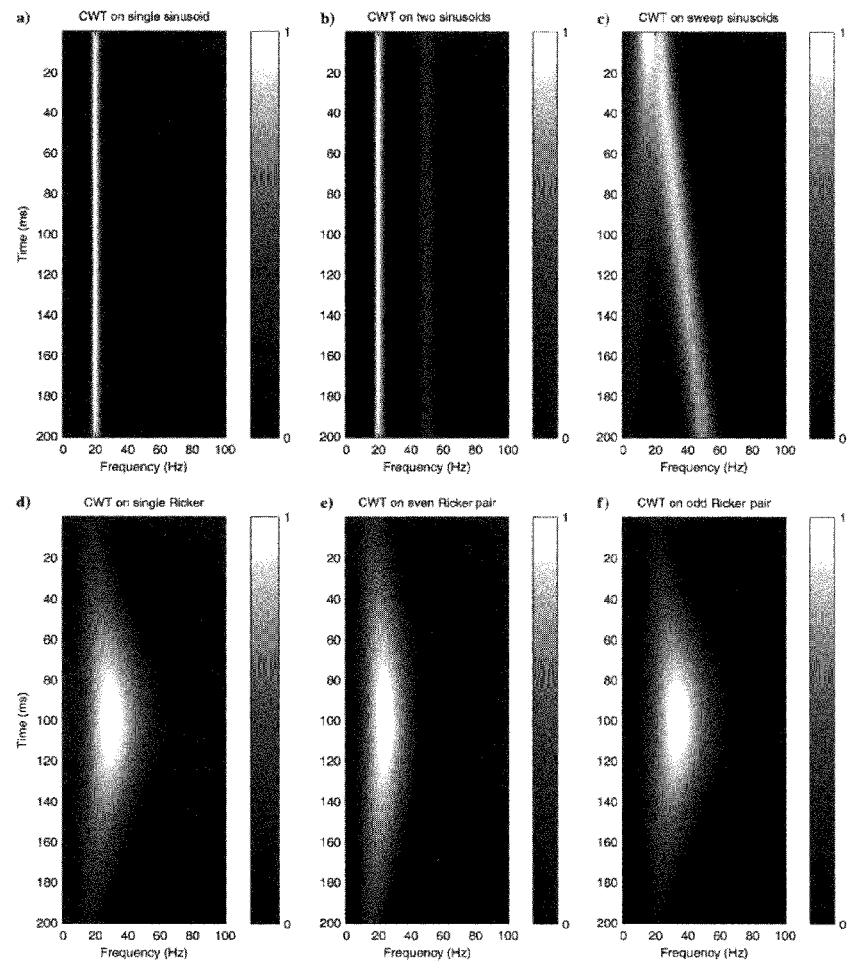
FIG. 7. Six panels illustrating application of the CWT with a Morlet wavelet dictionary to the six trace models with length 200 ms and sampling rate 1 ms shown in FIG. 3. Figures show (a) a single sinusoid at 20 Hz, (b) a pair of sinusoids 20 Hz and 50 Hz superimposed, (c) a chirp frequency sweep between 20 Hz and 50 Hz, (d) a single Ricker wavelet with a peak frequency of 30 Hz, (e) an even pair of 2 interfering Ricker wavelets with peak frequencies of 30 Hz and 10 ms spacing, and (f) an odd pair of 2 interfering Ricker wavelets with peak frequencies of 30 Hz and 10 ms spacing.

FIG. 7 shows the time-frequency panels from the application of the CWT to the six analytical waveforms shown in FIG. 5. The CWT was computed with a Morlet wavelet dictionary. On the sinusoid waveform frequency panels, we observe that the CWT has better low frequency spectral resolution than does the STFT (FIG. 7a). Furthermore, the CWT has better spectral resolution at 20 Hz than at 50 Hz (FIG. 7b). In FIG. 7c, we observe a smooth decrease in frequency resolution as a function of increasing frequency and decreasing Morlet basis independence. However, for the CWT, higher frequency resolution is achieved at the cost of time resolution. The Ricker panels show very significant smoothing across time at low frequencies; this smoothing effect diminishes as frequency increases. For the even dipole pair CWT (FIG. 7e), the reflectivity notch occurs at approximately 60 Hz compared to the analytical notch at 50 Hz. On application of the CWT to real seismic data traces, we expect poor time resolution and high frequency resolution at low frequencies and high time resolution and poor frequency resolution at high frequencies.

Figure 8:
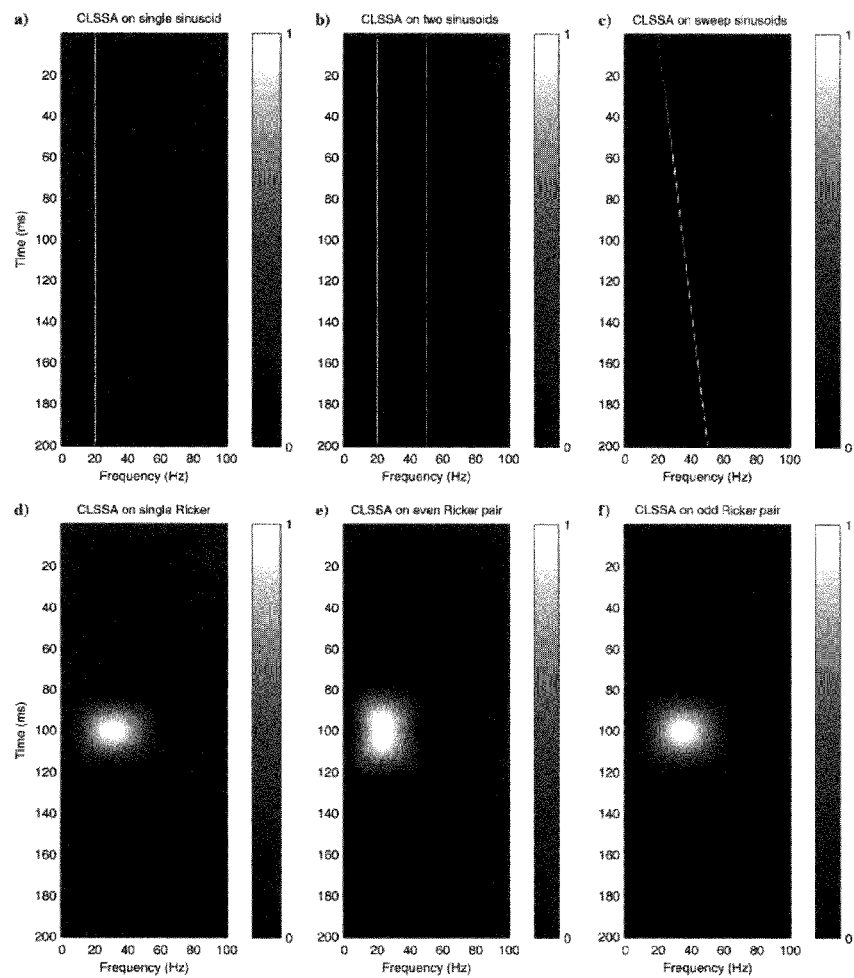
FIG. 8. Six panels illustrating application of the CLSSA using a window length of 40 ms to the six trace models with length 200 ms and sampling rate 1 ms shown in FIG. 3. Figures show (a) a single sinusoid at 20 Hz, (h) a pair of sinusoids 20 Hz and 50 Hz superimposed, (c) a chirp frequency sweep between 20 Hz and 50 Hz, (d) a single Ricker wavelet with a peak frequency of 30 Hz, (e) an even pair of 2 interfering Ricker wavelets with peak frequencies of 30 Hz and 10 ms spacing, and (0 an odd pair of 2 interfering Ricker wavelets with peak frequencies of 30 Hz and 10 ms spacing. For models a-c, $N_i=10$; and for models d-f, $N_i=1$.

FIG. 8 shows the time-frequency panels from the application of the CLSSA to the six analytical waveforms shown in FIG. 5. For models a-c, $N_i=10$; and for models d-f, $N_i=1$. On the sinusoid waveform frequency panels, we observe nearly perfect resolution of frequency content. The frequency coefficients are not smeared into their neighbors (i.e. there is no significant window smearing effect or spectral leakage). This observation is significant in that the neighboring frequency components are not well separated by the STFT. The CLSSA Ricker wavelet results also show obvious improvement in low-frequency time-resolution relative to the CWT and frequency resolution relative to both the STFT and CWT. The CLSSA Ricker spectra are more compact because they are not broadened by windowing effects. In FIG. 8e, the expected thin-bed notch appears close to the correct location (50 Hz) within the wavelet band. On application to real seismic data traces, we expect significant improvement in frequency resolution and the time-frequency resolution product over the STFT and CWT.

Figure 9:
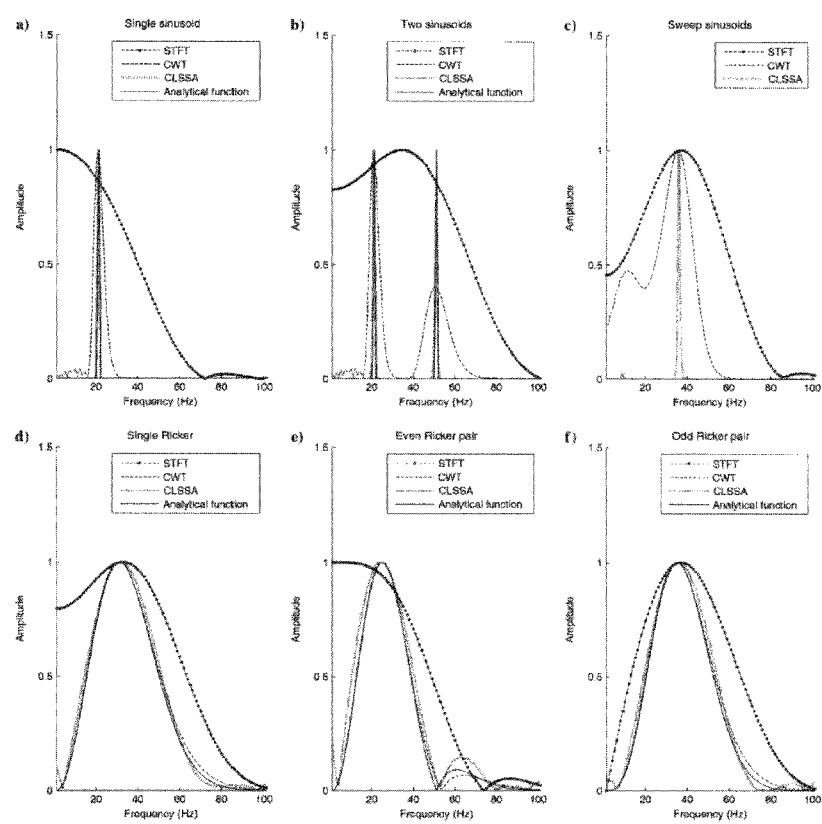
FIG. 9. Six plots comparing the STFT, CWT, CLSSA, and the analytical spectra of the six trace models shown in FIG. 3 at the center of the trace (t=101 ms). The STFT and CLSSA used a window length of 40 ms. Figures show the comparison for (a) a single sinusoid at 20 Hz, (b) a pair of sinusoids 20 Hz and 50 Hz superimposed, (c) a chirp frequency sweep between 20 Hz and 50 Hz, (d) a single Ricker wavelet with a peak frequency of 30 Hz, (e) an even pair of 2 interfering Ricker wavelets with peak frequencies of 30 Hz and 10 ms spacing, and (0 an odd pair of 2 interfering Ricker wavelets with peak frequencies of 30 Hz and 10 ms spacing. For models a-c, $N_i=10$; and for models d-f, $N_i=1$. Reflectivity notching patterns obscured by the DFT and CWT are apparent in the CLSSA 2D spectral panel result.

In order to further illustrate differences among the STFT, CWT, and CLSSA, we extract spectra at the time midpoint of the analytical waveform traces and compare them to their respective analytical spectra (FIG. 9). In FIGS. 9a and 9b, the STFT has a very strong DC component that is more representative of the spectrum of the Hann taper than of the data themselves. The CWT produces a spectrum that is more narrowly centered on the model sinusoid frequencies, although frequency resolution is still imperfect. The CLSSA closely matches the exact analytical solution. The waveform illustrated in FIG. 9c has no analytical solution since frequency varies continuously with time. However, the average frequency within the centrally located window is approximately 35 Hz. In applying the 40 ms window, the window smearing effect renders the STFT ineffective for spectral analysis of the waveform. The CLSSA computed spectra of the Ricker wavelet waveforms are narrower than those computed by the DFT and CWT and closer to the analytical spectrum. Note the accurate position of the notch in FIG. 9e.

Effect of Varying $N_i$

Figure 10:
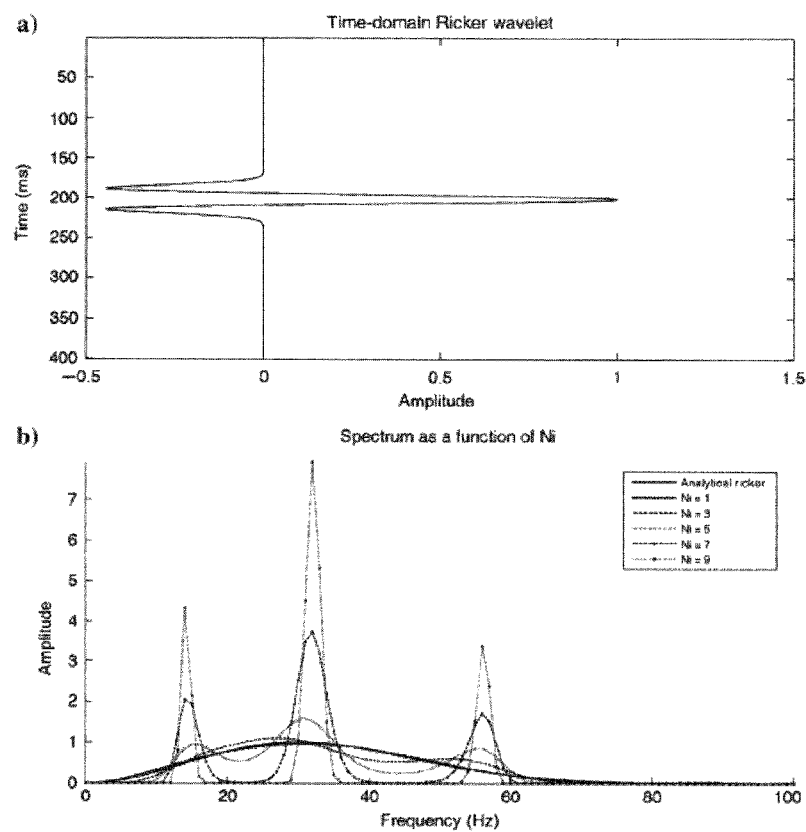
FIG. 10. Solutions for different Ni values applied to a 30 Hz Ricker wavelet within a 40 ms window. While Ni=1 closely approximates the true Ricker spectrum, increasing the number of iterations generates progressively sparser solutions. In the limit, these solutions tend toward a 3-sinusoid model as Ni increases (i.e. Ni=9). Thus, the Ricker wavelet within the windowed portion of the data could be accurately modeled as 3 beating sinusoids.
Figure 11:
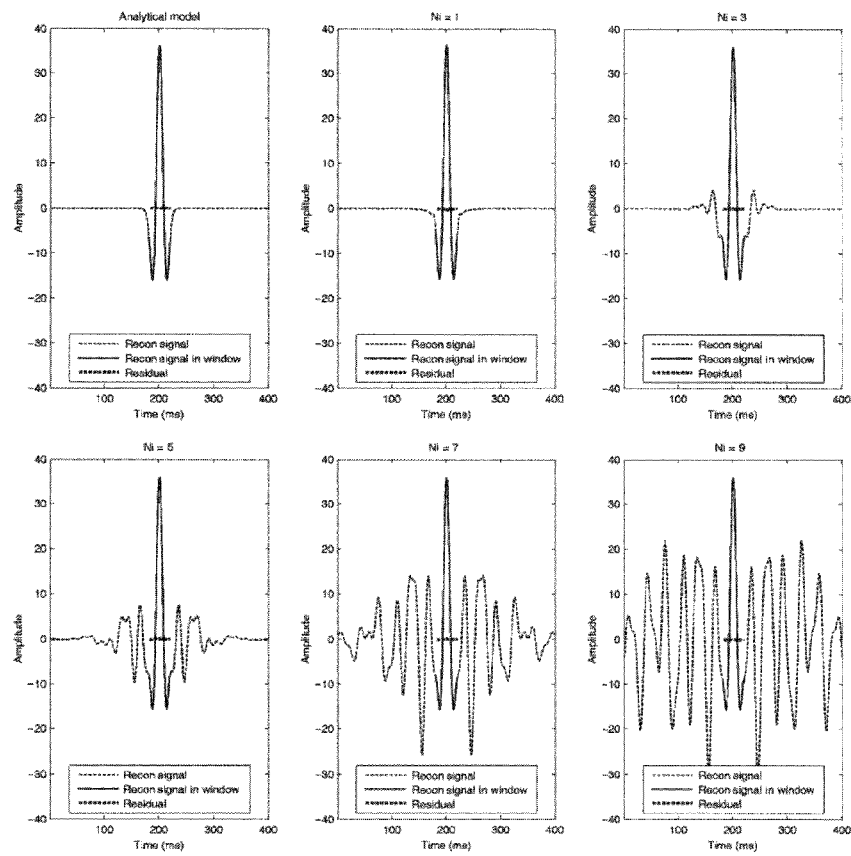
FIG. 11. Time-domain reconstruction of the Ricker wavelets within the window for the suite of Ni values. Note that, while all values of Ni closely match the signal within the window, the smooth Ni=1 spectrum produces the best match outside the window and most compact time domain representation of the signal. As further iterations (i.e. Ni>1) drive more frequency compactness, one observes increasing energy outside of the analysis window because the signal is approximated by fewer sinusoidal waveforms. However, note that notched spectra dominated by reflectivity might be better modeled by Ni>1.
Figure 12:
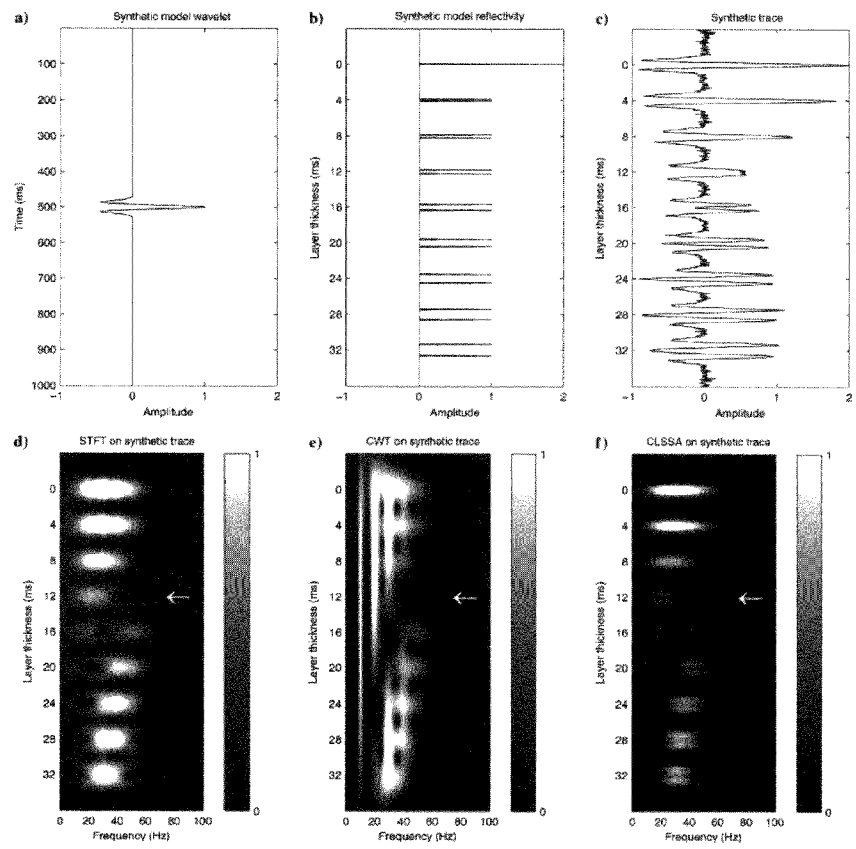
FIG. 12. Even dipole pair synthetic reflectivity model with increasing thickness as a function of time. In order to demonstrate robustness in the presence of noise, we added noise having an L2-norm equal to 0.1 times the L2-norm of the signal. Figures show (a) reflectivity model, (b) Ricker wavelet with center frequency=30 Hz, (c) synthetic model trace, (d) STFT applied to the synthetic trace using a window length of 40 ms, (e) CWT using a Morlet wavelet dictionary applied to the synthetic trace, and (f) CLSSA ($N_i=1$) applied to synthetic trace using a window length of 40 ms. The three methods show comparable robustness in the presence of noise. Reflectivity notching patterns related to thickness are obscured by the DFT and CWT, and apparent in the CLSSA spectral panel result. Temporal separation of events is better for the CLSSA result, which resolves layers as thin as approximately 12 ms at high frequencies (arrow). For beds thinner than this threshold, the events merge.
Figure 13:
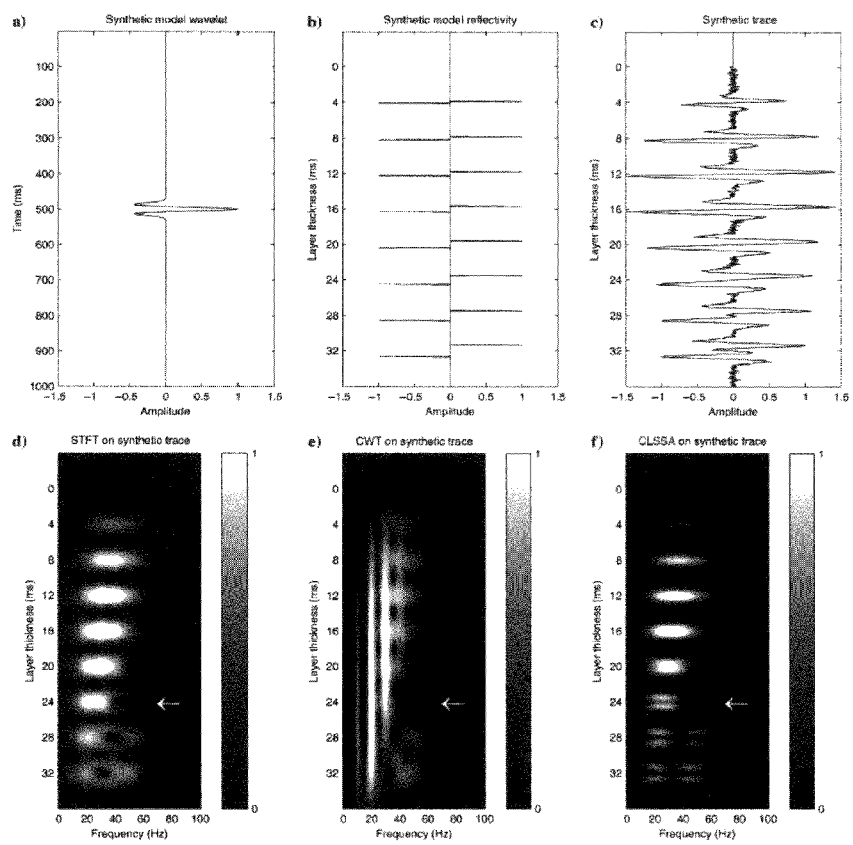
FIG. 13. Odd dipole pair synthetic reflectivity model with increasing thickness as a function of time. In order to demonstrate robustness in the presence of noise, we added noise having an L2-norm equal to 0.1 times the L2-norm of the signal. Figures show (a) reflectivity model, (b) Ricker wavelet with center frequency=30 Hz, (c) synthetic model trace, (d) STET applied to the synthetic trace using a window length of 40 ms, (e) CWT applied to synthetic trace, and (f) CLSSA ($N_i=1$) applied to synthetic trace using a window length of 40 ms. The three methods show comparable robustness in the presence of noise. None of the events are resolved by the STFT and CWT. Reflectivity notching patterns obscured by the CWT are apparent in the STFT and CLSSA spectral panels. CLSSA exhibits sharper spectral notches defining thin bed dipoles in the time domain. Temporal separation of events is observed for layers as thin as approximately 24 ms at high frequencies (arrow). For layers thinner than this threshold, the notching, observed at high frequencies, moves outside the data. The three methods show robustness in the presence of noise.

In order to assess the impact of varying the number of iterations $N_i$ of the method, we plot solutions for different $N_1$ values applied to a 30 Hz Ricker wavelet within a 40 ms window in FIG. 10. It is clear that while the CLSSA result for $N_i=1$ closely approximates the true Ricker spectrum, increasing the number of iterations generates progressively sparser solutions. In the limit, these solutions tend toward a 3-sinusoid model as $N_i$ increases. Thus, the Ricker wavelet within the windowed portion of the data can be modeled well as 3 beating sinusoids. FIG. 11 shows the time-domain reconstruction of the Ricker wavelets within the window for the suite of $N_i$ values. Note that, while results for different $N_i$ closely match the signal within the window, the smooth $N_i=1$ spectrum produces the best match outside the window and the most compact time domain representation of the signal. As further iterations (i.e. Ni>1) drive more frequency compactness, one observes increasing energy outside of the analysis window because the signal is approximated by fewer sinusoidal waveforms.

Application to Layered Synthetic Traces

We constructed layered blocky impedance synthetic models comprised of even and odd reflectivity dipoles in series. In order to demonstrate robustness in the presence of noise, we added noise having an L2-norm equal to 0.1 times the L2-norm of the signal. Time thicknesses are varied from 0 ms to 32 ms with a layer center spacing of 100 ms. The wavelet, reflectivity models, and resulting convolutional synthetic models are illustrated in FIGS. 12a-c and 13a-c. We applied the STFT, CWT, and CLSSA ($N_i=1$) to the even and odd synthetic events (FIGS. 12d-f and 13d-f). The STFT artifacts obscure the systematic reflectivity patterns and event identification in the frequency domain. The CWT suffers from the use of low frequency wavelets to analyze the low frequency components. These wavelets are temporally non-localized, and mix information from disparate reflectors. Hence, interferences between not only the bounding surfaces of individual thin layers but also interferences between nearby layers themselves are observed in the time-frequency panels as low frequency streaking artifacts. This effect can lead to false inferences about local reflectivity.

The CWT spectrum is not instantaneous; and, therefore, cannot quantify localized reflectivity spectra. In contrast, the CLSSA resolves the systematic shift in reflectivity notches (decreasing notch frequency with increasing thickness) and resolves top and base events 12 ms thick and greater for the even pair and 24 ms thick and greater for the odd pair. This difference in apparent resolution is due to the fact that a perfectly odd dipole conforms to the classical Widess (1973) resolution limit while the even impulse pair does not (see Puryear and Castagna, 2008). Also, the odd dipole pair notch occurs at higher frequencies than the even dipole notch (and can be outside the band of the data), thereby obscuring high frequency expressions of temporal thickness.

Resolution Analysis

Figure 14:
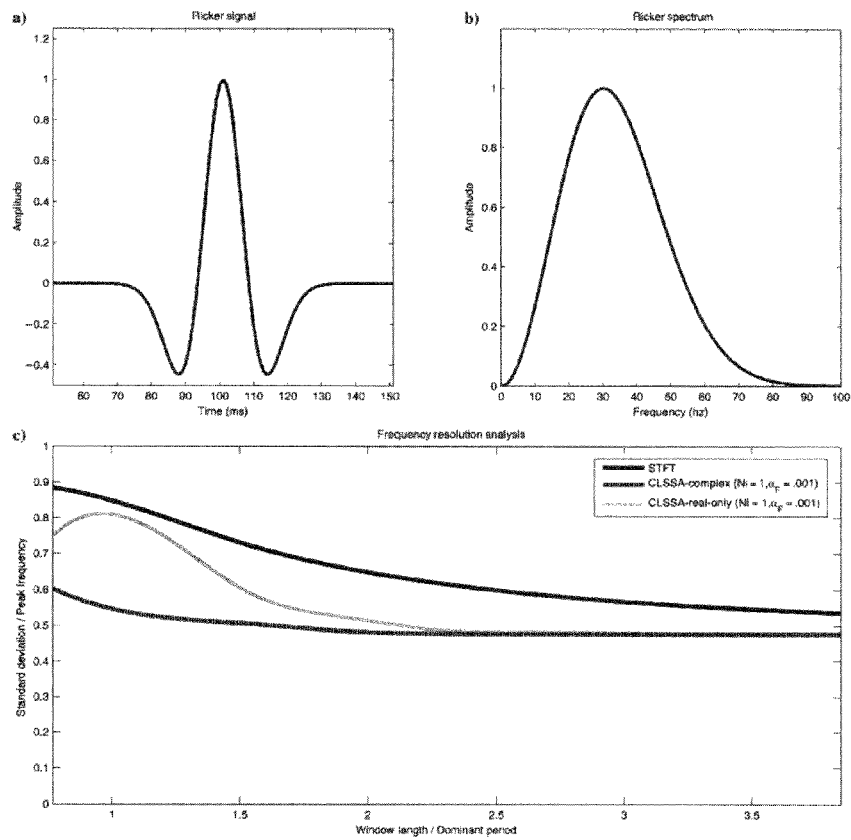
FIG. 14. Frequency Resolution test for Hann windowed STFT and CLSSA (Ni=1, $\alpha_F=0.001$) spectra of a Ricker wavelet. We compute standard deviation from the peak frequency. Plots show: (a) a 30 Hz Ricker wavelet signal, (b) the true Ricker wavelet spectrum and equivalent Gaussian function plotted to one standard deviation (c) weighted standard deviation computed on the STFT, CLSSA (Ni=1, $\alpha_F=0.001$), and real CLSSA (Ni=1, $\alpha_F=0.001$) frequency spectra (normalized by the peak frequency) for Hann windows ranging from 20 ms to 100 ms (normalized by the peak frequency period in the plot) applied to the Ricker wavelet. CLSSA has a significantly smaller weighted standard deviation than the STFT (i.e. the computed spectra are narrower for all window lengths within this standard use range). Real CLSSA shows similar advantages for longer windows (Window Length/Peak Frequency Period>2). For very long windows, the standard deviation results of all methods converge.

In order to better understand the time and frequency resolution characteristics of the STFT and the CLSSA ($N_i=1$), we applied the transforms using a range of window lengths centered on a Hann tapered Ricker Wavelet, and quantified the results using the standard deviation from the peak frequency of the spectrum as a measure of frequency resolution. This analysis would not be meaningful on the CWT because the effective window length is a function of frequency. In FIG. 14, we plot the frequency standard deviation around peak frequency normalized by peak frequency vs. the window length normalized by period of the peak frequency. The normalization is scale independent.

As windowing always broadens the Fourier spectrum, the standard deviation is traditionally used to measure frequency resolution (see discussion of Heisenberg's Uncertainty Principle in Bracewell, 1986). We used CLSSA both with and without the Hilbert operator. When using only the real waveform, CLSSA has exactly the same window length as the Fourier Transform; the plot thus proves that real CLSSA has better frequency resolution and Heisenberg uncertainty product than the Fourier Transform. For full CLSSA, the Hilbert operator senses data somewhat outside of the analysis window, so the comparison to Fourier is less exact. Nevertheless, the improvement in frequency resolution is clear, particularly for window lengths greater than twice the period corresponding to the peak frequency, where real and full CLSSA converge in resolution. As window length is reduced towards the period of the peak frequency, resolution of real CLSSA approaches that of the Fourier Transform. Below the period of the peak frequency, real CLSSA becomes unreliable and the comparison is less meaningful. It can be seen that for short windows, the stabilizing influence of using the Hilbert operator results in superior frequency resolution.

Real Data Trace Frequency Panels

Figure 15:
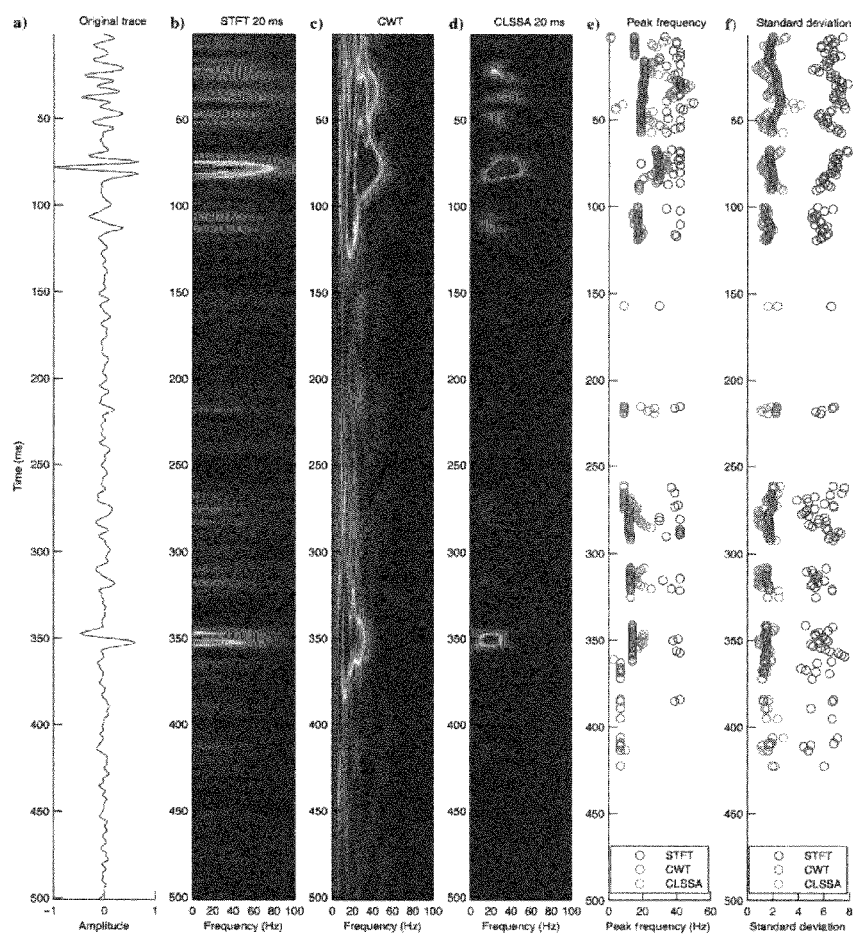
FIG. 15. Up-dip real data trace with spectral decomposition and associated attributes (reservoir is at approximately t=350 ms). Plots show (a) the original synthetic trace, (b) the 20 ms window STFT result, (c) the CWT result, (d) the 20 ms window single iteration CLSSA ($N_i=3$) result, (e) thresholded peak frequencies where amplitude is greater than 2 percent of maximum amplitude and DC peak frequencies are excluded, and (f) thresholded amplitude-weighted standard deviations where amplitude is greater than 2 percent of maximum amplitude.
Figure 16:
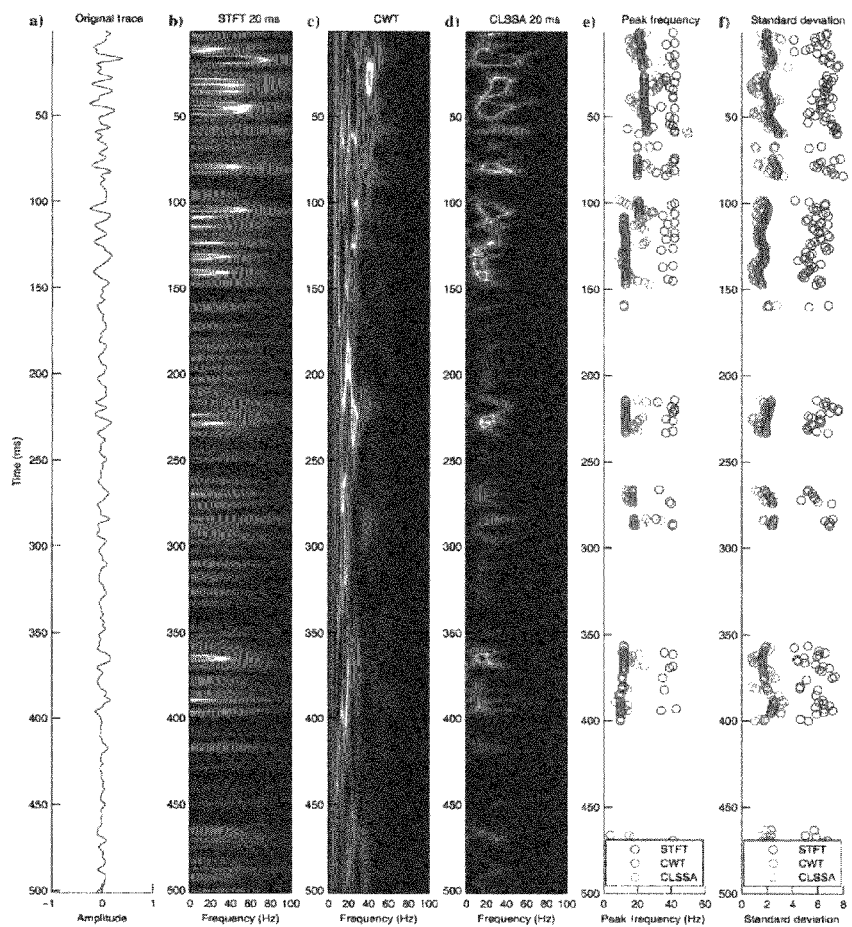
FIG. 16. Down-dip real data trace with spectral decomposition and associated attributes (down-dip brine is at approximately t=365 ms). Plots show (a) the original synthetic trace, (b) the 20 ms window STFT result, (c) the CWT result, (d) the 20 ms window single iteration CLSSA ($N_i$32 3) result, (e) thresholded peak frequencies where amplitude is greater than 2 percent of maximum amplitude and DC peak frequencies are excluded, and (1) thresholded amplitude-weighted standard deviations where amplitude is greater than 2 percent of maximum amplitude.

We compare the STFT, CWT, and CLSSA using frequency panels for a seismic data set with a bright spot associated with a known hydrocarbon accumulation. If well control is available, Ni should be chosen based on synthetic modeling. In the absence of well control, we chose Ni=3 because it reveals high-resolution peak frequency trends in the up-dip and down-dip example traces. In FIGS. 15 and 16, we display frequency panels through the formation at the bright spot (t=350 ms) and correlative down-dip (t=365 ms) sand locations. Displayed are the original trace, time-frequency gathers for the STFT, CWT, and CLSSA, peak frequency for each method, and standard deviation in frequency for each method. In order to fix the time resolution while studying frequency resolution, we applied the STFT and CLSSA using identical 20 ms Hann tapered windows.

The CWT has very poor time resolution at low frequencies, and is dominated by the mixing of low frequency energy from nearby reflectors in the temporal vicinity of the bright spot (FIG. 15). The STFT result includes the doublet artifact of the trough over peak reservoir event, resulting from a strong DC bias when the short window predominantly isolates a single positive or negative waveform loop. Although the STFT and CLSSA show comparable time resolution fixed by the choice of window length, the CLSSA frequency section yields superior detail of the frequency characteristics of the bright spot sand. The STFT frequency energy is smeared across the spectrum and outside the bandwidth of the data, yielding poor frequency resolution and shifting the peak frequency to the high end of the spectrum. CLSSA spectral energy is not smeared outside the actual data bandwidth at the upper limit, although a local DC component appears at the side-lobes due to the short window. It is noteworthy that the CLSSA yields high frequency resolution and accuracy using such a short window, while spectral distortion from the STFT renders it unsuitable for spectral analysis using the same short window.

We computed peak frequencies and standard deviations where trace sample amplitudes were greater than 2 percent of the maximum amplitude, excluding DC peak frequencies (an artifact of the short window). Peak frequency vs. time for the up-dip sand is shown in FIG. 15e. Note the significantly higher STFT peak frequencies at the reservoir and the correlative down-dip sand due to spectral smearing. In general, the CLSSA yields higher peak frequency estimates than the CWT, which is biased toward low frequency energy. Mean peak frequencies are 40.56 for the STFT, 16.67 for the CWT, and 25.95 for CLSSA. Standard deviation vs. time for the up-dip sand is plotted in FIG. 15f. Like peak frequencies, standard deviations about the mean frequency of the STFT are consistently and significantly higher than those of the CWT and CLSSA. CLSSA generally has lower standard deviation values than the CWT (it has better frequency resolution). Mean standard deviations are 4.98 for the STFT, 2.02 for the CWT, and 1.59 for CLSSA.

On the down-dip section (FIG. 16), it is also clear that CLSSA is More sensitive to local peak frequency variation than STFT and CWT and that its standard deviations are lower. We anticipate that CLSSA will produce better stratigraphic resolution on frequency attribute maps. While amplitudes are dimmer on the down-dip section, peak frequencies are lower, indicating possible changes in the reflectivity spectrum.

Application to 3D Seismic Data

Figure 17:
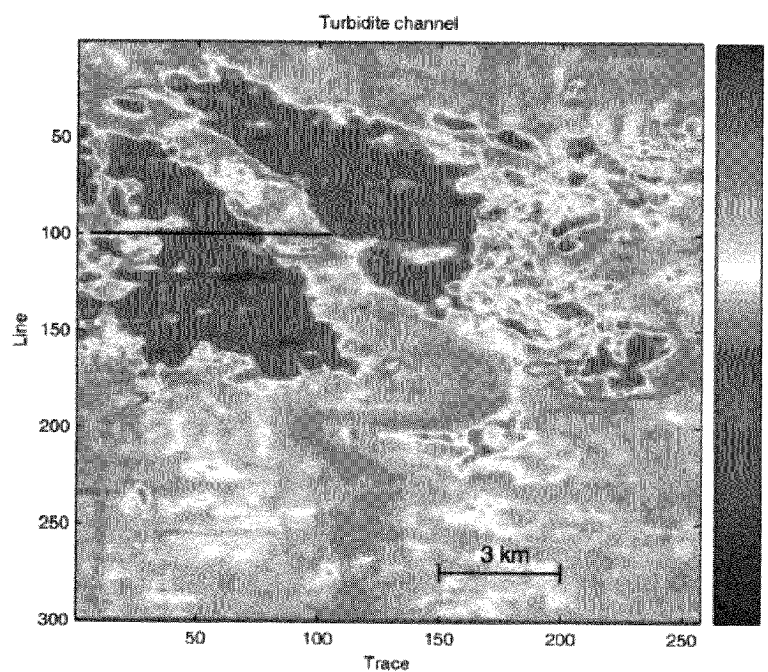
FIG. 17. Amplitude on horizon of a levied turbidite channel system from a Gulf of Mexico dataset. Black line shows the location of vertical sections in FIGS. 18-19.

We apply the methods studied in this paper to a Gulf of Mexico seismic dataset that images a levied turbidite channel. The data show a shale-filled turbidite with bright spot sand levies that are producing reservoirs. An amplitude extraction on the turbidite horizon is shown in FIG. 17. The large-scale stratigraphic feature masks many smaller features that can potentially be revealed using spectral decomposition.

Figure 18:
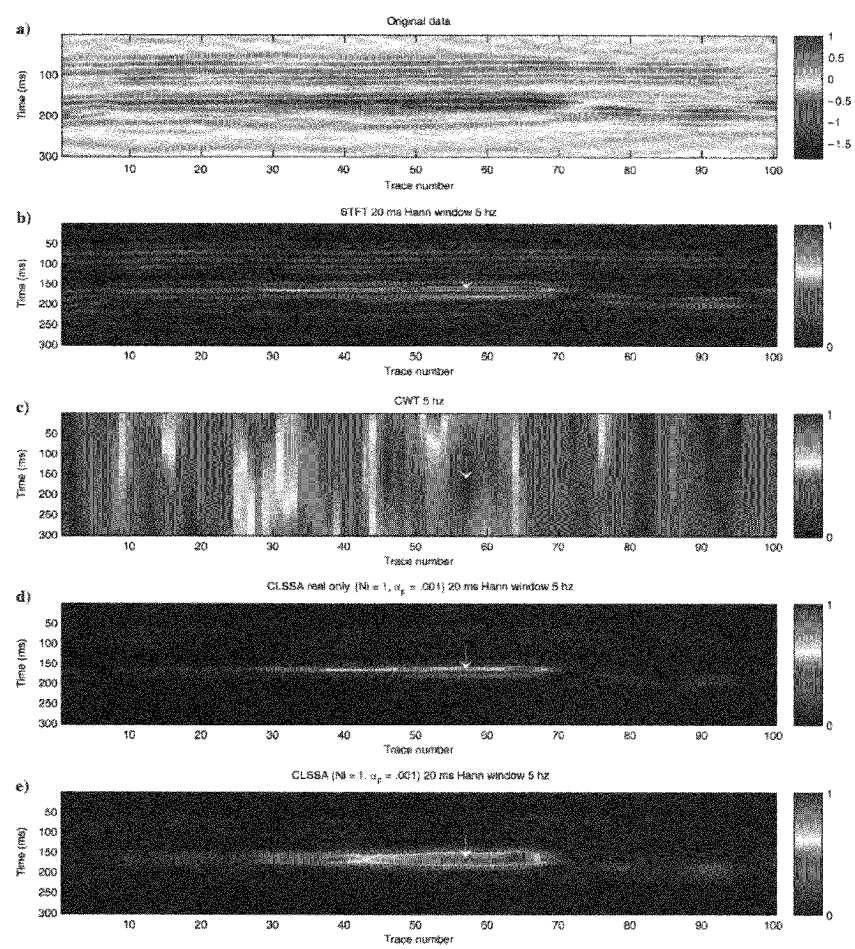
FIG. 18. 5 Hz vertical isofrequency sections the black line show in FIG. 15. STFT and CLSSA results were achieved using a Hann window. Plots show (a) original data (b) 20 ms STFT result, (c) CWT result, (d) 20 ms Hann windowed CLSSA (Ni=1, $\alpha_F$=0.001) using only the real part of the signal, and (e) 20 ms Hann windowed CLSSA (Ni=1, $\alpha_F$=0.001) using the complex signal. Arrows show the thicker part of the overbank deposit that is highlighted by complex CLSSA, which captures low frequencies well. The CWT simply integrates to isolate the channel surrounding information. Neither the STFT nor the real CLSSA capture the low frequency information for the very short window.
Figure 19:
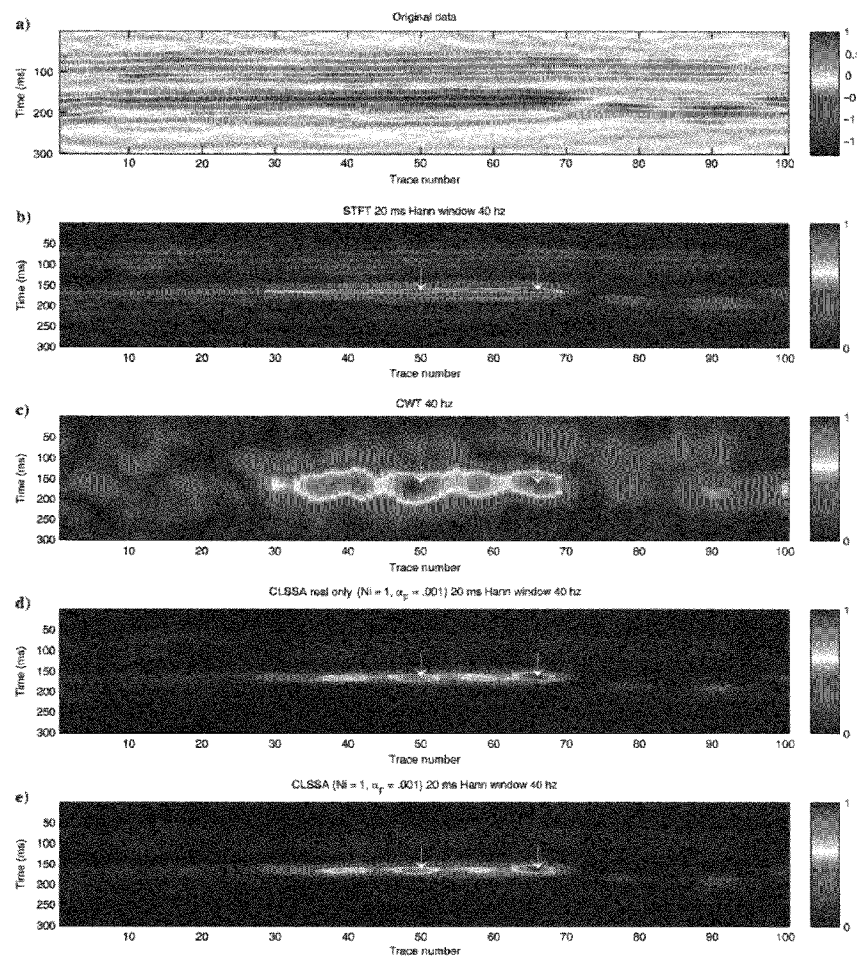
FIG. 19. 5 Hz vertical isofrequency sections along the black line show in FIG. 15. STFT and CLSSA results were achieved using a Hann window. Plots show (a) original data, (b) 20 ms STFT result, (c) CWT result, (d) 20 ms Hann windowed CLSSA (Ni=1, $\alpha_F$=0.001) using only the real part of the signal, and (e) 20 ms Hann windowed CLSSA (Ni=1, $\alpha_F$=0.001) using the complex signal. Arrows show the thinner edges of the overbank deposit that is highlighted by both complex and real CLSSA, both of which resolve the higher frequencies well. The CWT captures the frequency information but is not well resolved in time. The STFT smears information across the spectrum, and the thicknesses locations that respond preferentially to 40 Hz are not isolated.

FIG. 18 shows the original data with prominent brightspot overbank deposits and 5 Hz isofrequency vertical sections along the black section line shown in FIG. 17. We display results from both real and complex Hann windowed CLSSA (Ni=1, $\alpha_F$=0.001) in order to enable a more exact windowed comparison between CLSSA and STFT. We note that the thicker portion of the overbank deposit is highlighted at 5 Hz by complex CLSSA. However, neither the real CLSSA nor the STFT effectively capture this low frequency feature. The omission can be attributed to the fact that complex CLSSA preferentially accounts for low frequency information due to the effect of the Hilbert transform, which translates low frequency information from outside the window into the windowed portion. The CWT has extremely low temporal resolution at low frequencies, and reveals little useful information. At 40 Hz (FIG. 19), thinner portions of the overbank deposit are highlighted by both real and complex CLSSA. These appear as nearly symmetrical amplitude peaks migrating laterally from the thicker center of the overbank deposit. The predicted two-way temporal thickness at these locations is thus 1/40 Hz=25 ms. The STFT also shows anomalous amplitude in the vicinity of these peaks, but these amplitudes are not spatially isolated as are the CLSSA results. We interpret this to be the effect of spectral smearing of energy from other portions of the spectrum, which homogenizes the isofrequency response and suppresses frequency anomalies of interest. Thus, for this short 20 ms window, accurate thickness prediction of these areas of the overbank deposit can be achieved by the real and complex CLSSA but not by the STFT.

Figure 20:
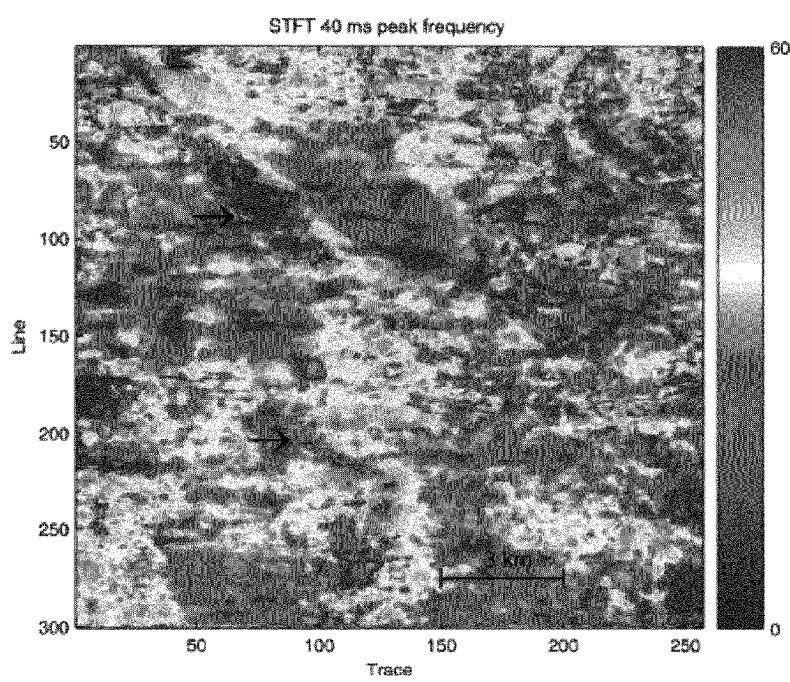
FIG. 20. Mapview of STFT peak frequency section on the turbidite system shown in FIG. 17. The STFT was computed using a 40 ms Hann window. Black arrows are in the same locations as those shown in FIG. 20. While the turbidite trunk is visible in some locations, the lack of frequency resolution degrades lateral continuity and hinders the peak frequency mapping interpretation.
Figure 21:
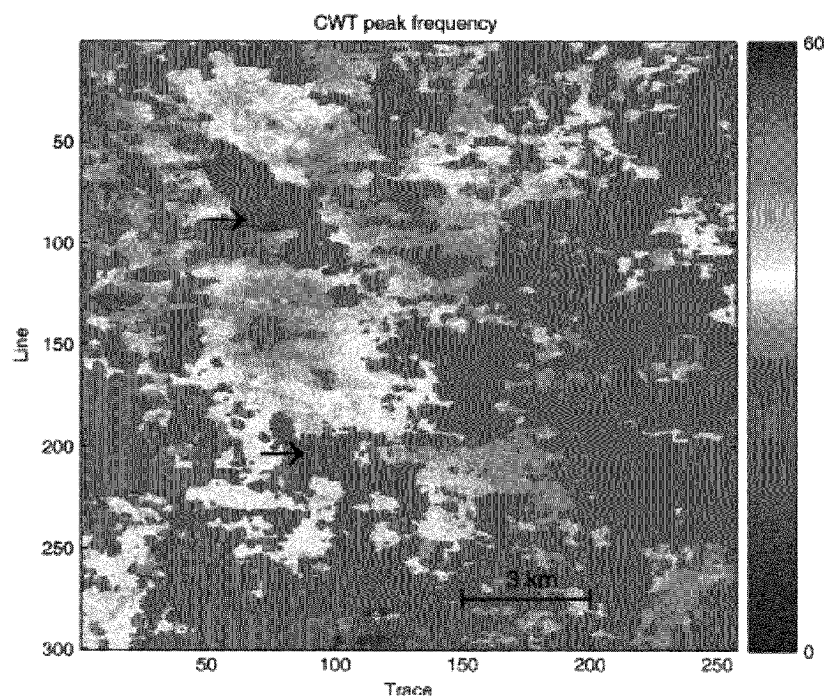
FIG. 21. Mapview of CWT peak frequency section on the turbidite system shown in FIG. 17. Black arrows are in the same locations as those shown in FIG. 20. However, the turbidite trunk expression is less continuous and more difficult to track on the CWT result due to poor temporal localization at low frequencies.
Figure 22:
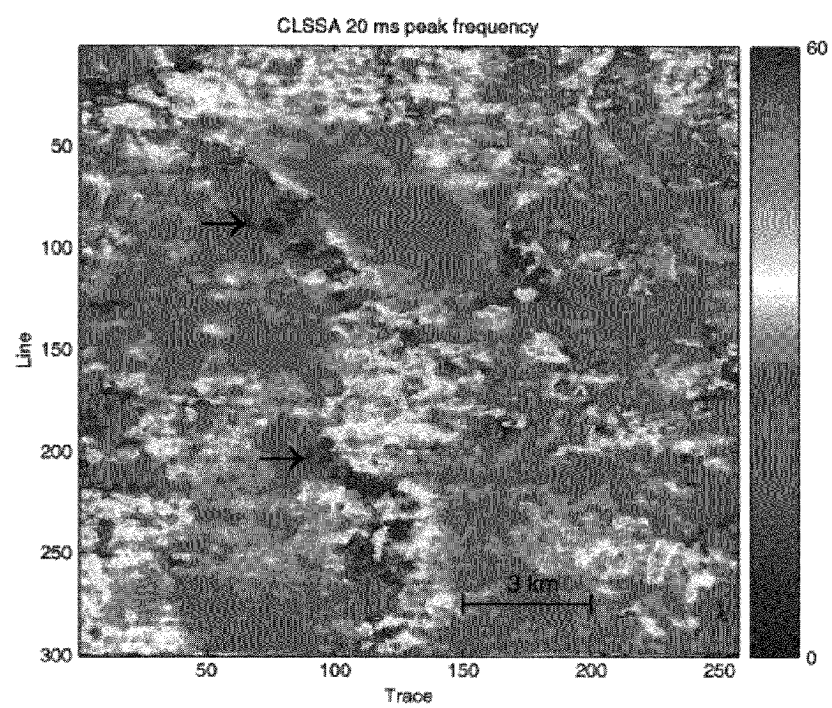
FIG. 22. Mapview of CLSSA (Ni=1, $\alpha_F$=0.001) peak frequency section on the turbidite system shown in FIG. 17. The CLSSA result was computed using a 20 ms Hann window. Black arrows indicate the main turbidite trunk that is revealed by the peak frequency attribute extracted on CLSSA.

A key benefit of using spectral decomposition interpretation is the identification of stratigraphic architectural features not obvious in broadband amplitude maps. The features "tune" or resonate at particular frequencies or within a very narrow frequency band. By tracking the peak frequency, which is the frequency with the highest amplitude across the spectrum, one can highlight stratigraphic features and map thickness. FIGS. 20-22 show peak frequency maps on the turbidite horizon for the 40 ms STFT, CWT, and 20 ms CLSSA (Ni=1, $\alpha_F$=0.001). Because CLSSA preferentially incorporates low frequency information from outside the window by the Hilbert transform, we plot 40 ms STFT results in order to provide adequate low frequency resolution to compare the results. The STFT result, while revealing portions of the channel architecture, shows limited lateral continuity. Black arrows indicate the possible location of the channel trunk. The CWT peak frequency result (FIG. 21) is plotted with the black arrows in the same position as the CLSSA result. This map reveals sections of the channel, although not sufficiently to decipher the sinuous geometry of the trunk. This is attributed to the fact that the CWT low frequency mother wavelets integrate information from above and below the channel so that the local low frequency time response is not captured. The CLSSA result (FIG. 20) shows the thick trunk of the channel highlighted at low frequencies. Details of the planview geometry of the trunk feature not noticeable on the original amplitude section (FIG. 17) can be observed in the peak frequency mapview, enabling inferences about the structure of the trunk. Using CLSSA, improved frequency resolution contributes to the spectral decomposition interpretation, enabling the mapping of stratigraphic features by providing a different view of the objective.

Discussion

Our modeling and real data spectral decomposition results show noteworthy improvement in resolution that follows from the application of fundamental principles of Fourier theory discussed in this paper. In order to generate valid time-frequency signal decompositions representative of the data within the window, rather than the windowed data, application of the Fourier Transform requires that the basis sinusoids be orthogonal. Generally, Fourier theory is to this day still commonly applied using implicit analog assumptions, while the signals themselves have evolved to digital. Practitioners have learned to understand and deal with the consequences of windowing; however, in digital applications, it is not necessary to assume that the off-diagonal terms of the normal equations are zero, as the Fourier Transform implicitly does. Windowing effects can be mitigated by incorporating a priori information. For short windows, the STFT produces a set of sparse, evenly spaced spectral coefficients, resulting in dilution of spectral information content. Instead of being projected onto the continuous frequency domain, energy is restricted to discrete frequencies, resulting in distortion. Furthermore, there is no a priori information incorporated into the STFT formulation to favor resolution of the seismic band of interest.

With the development of modern computational science and inverse theory, these limitations of the STFT are surmountable. Instead of independently cross-correlating the signal with each orthogonal basis, we solve the normal equations with non-zero off-diagonal terms, thereby significantly reducing spectral component leakage. To do so robustly requires constraints, and our CLSSA formulation readily incorporates such constraints. Thus, the inversion for frequency coefficients can be formulated by including a priori knowledge of the signals through $W_m$.

The complex trace effectively lengthens the window according to frequency. The Hilbert transform operator incorporates more information from outside the window at low frequencies than at high frequencies. In this sense, the complex CLSSA can be considered as having a frequency-dependent window. More importantly, the complex trace permits the use of infinitesimally short windows. For example, in the limit we can use just one sample window. In that case, CLSSA will simply produce instantaneous phase and frequency of one equivalent sinusoidal function.

The results of applying CLSSA to waveform models and real data traces validate the theoretical improvement in spectral resolution, and the hypothesis that the time-frequency product limitation can be improved over conventional methods. An additional benefit of the CLSSA method is that it does not require even sampling of the data in time or space, and can therefore be readily applied to a variety of seismic processing, inversion, and analysis problems. It is inferred that different types of signals will exhibit spectral-statistical characteristics that can be exploited by inversion formulations tailored to these characteristics. However, further modeling and case studies on seismic data are required to better understand the potential applications in identification and interpretation of geological features of interest.

There are a variety of avenues fir future research aimed at furthering the CLSSA method: improved inversion algorithms, combination of window types and lengths, better use of STFT and CWT results as constraints, handling the DC problem better etc. We have attempted to show the promise of the CLSSA approach; however a number of complete case study comparisons to STFT, CWT, and other methods etc. will be needed before definitive conclusions can be drawn.

Whether or not one is convinced that CLSSA spectra are superior to those obtained using the CWT or STFT, the simple fact that the results are different is significant. Time-frequency analysis is non-unique, and there is no correct answer. A different valid answer may prove to be a useful addition to multi-attribute analysis in a given circumstance.

CONCLUSIONS

We developed an inversion-based algorithm for computing the spectral decomposition of seismic data using CLSSA and tested the algorithm on synthetic waveforms and real data. The decomposition is performed by the inversion of a basis of truncated sinusoidal kernels in a short time window. The method results in a time-frequency analysis with frequency resolution and time-frequency product superior to the STFT and the CWT. The classical spectral smoothing inherent to Fourier spectral analysis of windowed data is reduced or eliminated, thereby allowing analysis of the spectral characteristics of composite reflections within windows significantly shorter than those used in previously published spectral decomposition work. We demonstrated the efficacy of the CLSSA transform on 6 synthetic waveforms. For sinusoidal waveforms, spectral content was resolved nearly perfectly using CLSSA, while frequency smearing effects dominated the STFT and CWT spectra. Ricker wavelet spectra were also well resolved within the short window. En all cases, the CLSSA spectra had narrower bandwidth than the CWT and STFT spectra due to the absence or reduction of window smearing effects. The real data trace frequency panel results showed improvements in the spectral analysis of a bright spot, including narrower frequency spectra and more detailed peak frequency trends potentially related to geological characteristics. Application of the method to a seismic dataset containing a turbidite channel system resulted in the tentative interpretation of architectural elements not observed using conventional spectral decomposition methods.

It can be appreciated in the disclosure of the methods described herein that the corresponding physical acquisition and processing systems have been implicitly and/or explicitly described. Further, it can be appreciated in the disclosure of the methods described herein that the corresponding electronics and computer hardware physical systems for performing the seismic processing steps have been implicitly and/or explicitly described.

Thus, the foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to explain the best mode for practicing the invention, and to enable others skilled in the art to utilize the invention and such or other embodiments and with various modifications required by the particular applications or uses of the invention.

What is claimed is:

1. An inversion-based algorithm for computing the time-frequency analysis of reflection seismograms, comprising:
   receiving seismic waveforms associated with a tested field;
   computing Fourier series coefficients as a function of time for seismic waveforms directly by inverting a basis of truncated sinusoidal kernels for a moving time window;
   applying the Fourier series coefficients to the seismic waveforms for a plurality of moving time windows;
   determining spectral characteristics of interfering reflections within the windows; and
   correlating the determined spectral characteristics with geological features of the tested field;
   identifying one or more stratigraphic features of the tested field based on the correlated spectral characteristics; and
   mapping a thickness of the identified stratigraphic features.

* * * * *